US011687330B2

(12) United States Patent
Jain et al.

(10) Patent No.: US 11,687,330 B2
(45) Date of Patent: Jun. 27, 2023

(54) INSTALLATION OF A SOFTWARE UNIT IN A LAYER STACK USING DEPLOYMENT PARAMETERS

(71) Applicant: Microsoft Technology Licensing, LLC, Redmond, WA (US)

(72) Inventors: Anshul Jain, Bellevue, WA (US); Prabhat Kumar Pandey, Redmond, WA (US); Carlos Cabral Dietrich, Bothell, WA (US); Himani Ganjoo, Woodinville, WA (US); Shannon Ronald McArthur, Snohomish, WA (US); Vinay Singh, Redmond, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 0 days.

(21) Appl. No.: 17/342,245

(22) Filed: Jun. 8, 2021

(65) Prior Publication Data

US 2022/0391186 A1 Dec. 8, 2022

(51) Int. Cl.
*G06F 8/61* (2018.01)
*G06F 8/70* (2018.01)

(52) U.S. Cl.
CPC . *G06F 8/61* (2013.01); *G06F 8/70* (2013.01)

(58) Field of Classification Search
CPC ..................................... G06F 8/61; G06F 8/70
See application file for complete search history.

(56) References Cited

U.S. PATENT DOCUMENTS

| 7,461,086 B1 * | 12/2008 | Hurren ...................... G06F 8/61 |
| | | 707/999.102 |
| 2004/0250247 A1 * | 12/2004 | Deeths ....................... G06F 8/61 |
| | | 717/169 |
| 2011/0113070 A1 * | 5/2011 | McCurdy .................. G06F 8/65 |
| | | 717/169 |
| 2013/0232463 A1 | 9/2013 | Nagaraja et al. |

(Continued)

OTHER PUBLICATIONS

Du, Weichang, and Lei Wang. "Context-aware application programming for mobile devices." Proceedings of the 2008 C3S2E conference. 2008. (Year: 2008).*

(Continued)

*Primary Examiner* — S. Sough
*Assistant Examiner* — Joanne G Macasiano
(74) *Attorney, Agent, or Firm* — Holzer Patel Drennan

(57) ABSTRACT

Deployment of a software unit into a software application layer stack using deployment parameters including an ordering behavior parameter and a reference parameter. The deployment of the software unit may be in response to receipt of a software package for installation of the software unit. Installation of the software unit may be provided according to a hierarchical rule structure that includes determining whether the software unit comprises an upgrade or a patch to an existing software unit in the layer stack. If not an upgrade or a patch, an ordering behavior parameter may indicate a relative position to install the software unit in relation to a software unit designated by the reference parameter. If the deployment parameters are not valid, installation of the software unit may be provided according to a default rule.

20 Claims, 18 Drawing Sheets

(56) References Cited

U.S. PATENT DOCUMENTS

| | | | |
|---|---|---|---|
| 2014/0359594 A1* | 12/2014 | Erbe | G06F 8/65 |
| | | | 717/169 |
| 2017/0255462 A1* | 9/2017 | Azagury | G06F 9/30181 |
| 2017/0277524 A1* | 9/2017 | Bhat | G06F 8/60 |
| 2018/0136920 A1 | 5/2018 | Devagupthapu et al. | |
| 2018/0275987 A1* | 9/2018 | Vandeputte | G06F 9/455 |

OTHER PUBLICATIONS

Modahl, Martin, et al. "UbiqStack: a taxonomy for a ubiquitous computing software stack." (2005). (Year: 2005).*

"International Search Report and Written Opinion Issued in PCT Application No. PCT/US22/028252", dated Aug. 11, 2022, 11 Pages.

* cited by examiner

INSTALLATION OF A SOFTWARE UNIT IN A LAYER STACK USING DEPLOYMENT PARAMETERS

BACKGROUND

Traditionally, software development has almost exclusively been performed by specially skilled software developers. Software applications have been developed using software languages to perform a given functionality. In turn, customization or individual configuration of software was limited and required skilled developers to configure the software as requested by a customer.

Recent trends have resulted in so-called "low-code" applications to be developed that may utilize customized software components that are configurable without the need for extensive knowledge of software languages to develop software for an application. For example, many business intelligence applications may provide low-code tools that allow businesses to customize applications to a given business need. Frequently such low-code applications include software units arranged in an application layer stack (or simply a "layer stack") that define a hierarchical order of operation of the software units comprising the software application. While low-code environments may allow for increased flexibility, customization, and configuration of an application for a given functionality desired by a customer, there continues to be a need for improvements in the development and/or deployment process of low-code applications.

SUMMARY

The present disclosure facilitates improvements to the deployment of software units into a layer stack. Specifically, the present disclosure includes a method of installing a software unit in an application environment. The method includes receiving a software package comprising at least one software unit. The method also includes identifying, for the at least one software unit an ordering behavior parameter and a reference parameter. The ordering behavior parameter relates to relative placement of the at least one software unit in a layer stack of the application environment. The layer stack defines an order of operation of software units in the layer stack. The reference parameter identifies one or more reference software units in the layer stack. In turn, the method includes installing the software unit into the layer stack of the application environment based on the ordering behavior parameter and the reference parameter.

This Summary is provided to introduce a selection of concepts in a simplified form that is further described below in the Detailed Description. This Summary is not intended to identify key features or essential features of the claimed subject matter, nor is it intended to be used to limit the scope of the claimed subject matter.

Other implementations are also described and recited herein.

BRIEF DESCRIPTIONS OF THE DRAWINGS

FIGS. 5-16 examples of installation behavior of a software unit contained in a software package that is installed in a layer stack.

Figure 17:
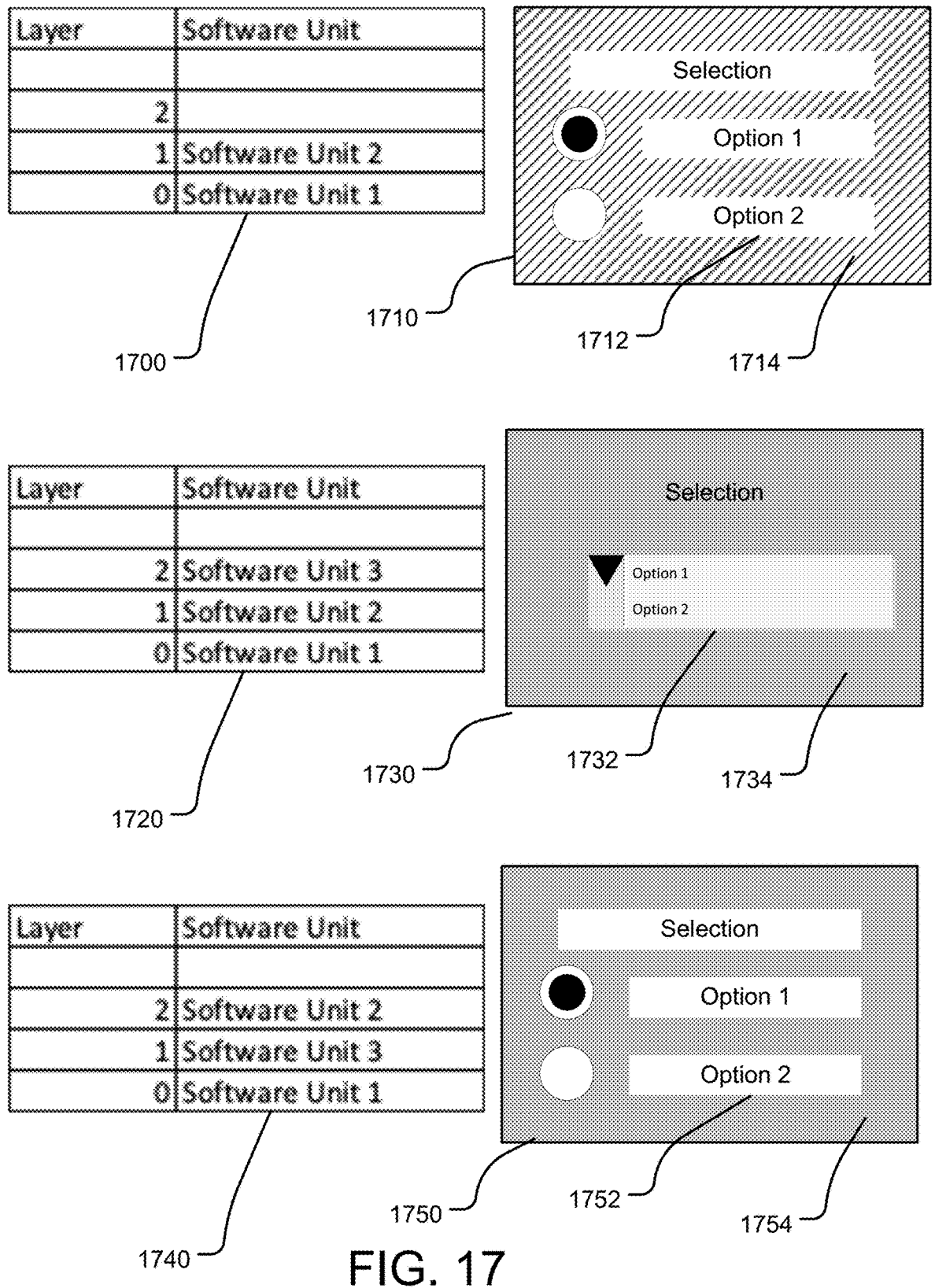

FIG. 17 depicts an example of a user interface generated by a layer stack of software units with different installation examples for a new software unit.

Figure 18:
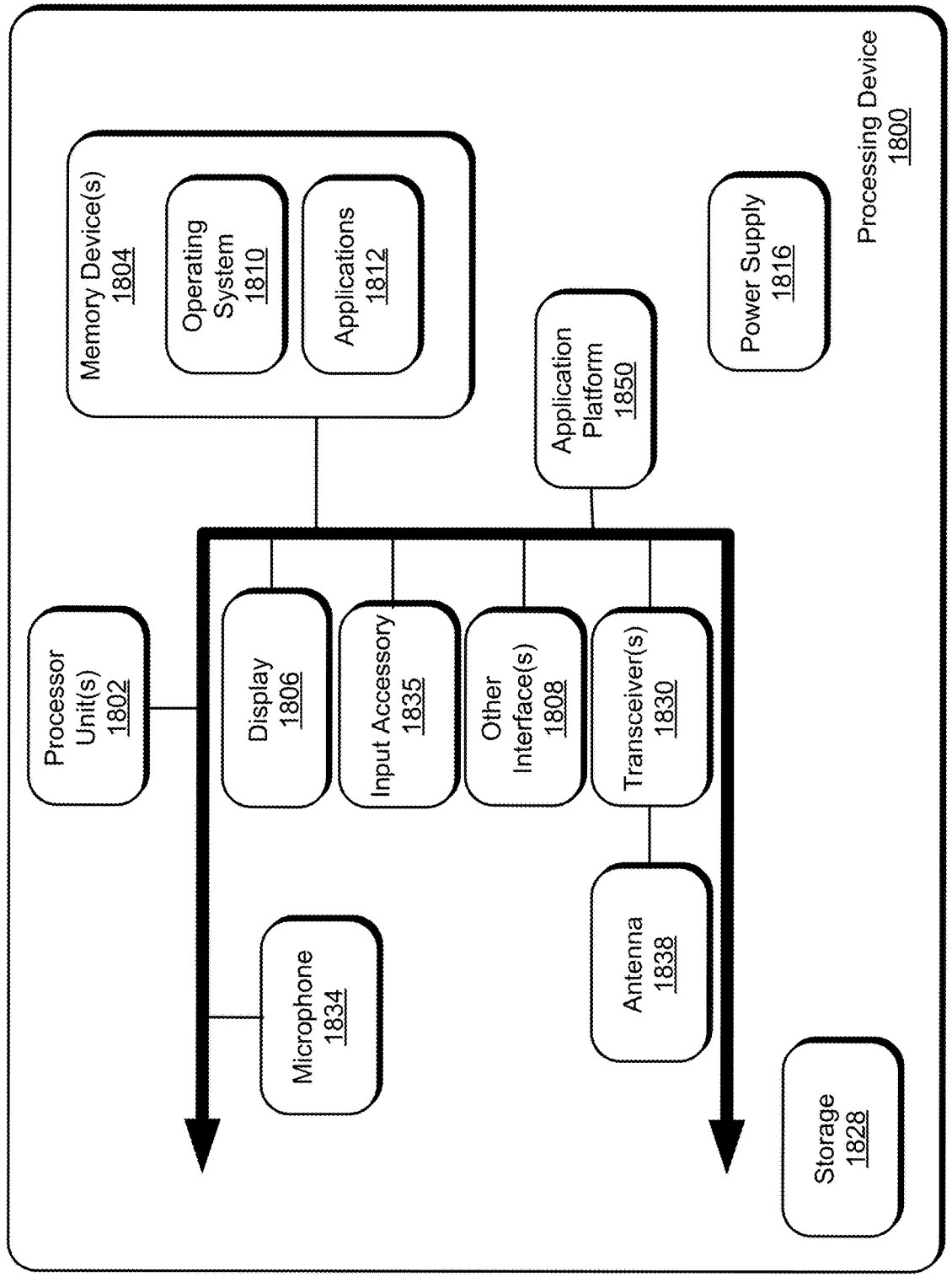

FIG. 18 depicts an example processing device for execution of aspects of the present disclosure.

DETAILED DESCRIPTIONS

While the invention is susceptible to various modifications and alternative forms, specific embodiments thereof have been shown by way of example in the drawings and are herein described in detail. However, it should be understood that it is not intended to limit the invention to the particular form disclosed, but rather, the invention is to cover all modifications, equivalents, and alternatives falling within the scope of the invention as defined by the claims.

The present disclosure relates to deployment of a software package to install at least one software unit into a layer stack of an application platform. Specifically, the present disclosure facilitates use of deployment parameters including, for example, an ordering behavior parameter and a reference parameter that allows a software unit of a software package to be installed into a layer stack of an application platform such that the software unit may be positioned in the layer stack of the application platform based on the deployment parameters. In this regard, a software unit installed in the layer stack may be located relative to other software units in the layer stack based on the deployment parameters to provide predictability of the layer stack behavior. In addition, the use of the deployment parameters may provide a suggested or preferred installation location, which may be subject to a hierarchical rule structure related to the installation of a software unit into the layer stack.

In traditional application environments, installation of a software unit into a layer stack comprising one or more software units often resulted in the newly installed software unit being added as a top layer to the layer stack without the ability to alter this behavior. However, as the order of software units in the layer stack may define an order of operation of the software units comprising the software application, a desired operation order may be disrupted by adding the software unit at the top layer. Accordingly, dependencies on other software units in the layer stack may be broken or overridden upon deploying a new software unit into the top level of a layer stack. As a result, the addition of a new software unit as a top layer of the layer stack often resulted in system managers having to reinstall all software units in the layer stack in a particular order to maintain the desired operations when adding, updating, or patching a software unit. This reinstallation was necessary to provide proper linking, dependencies, and other behaviors of the software units in the layer stack. However, such reinstallation is time-consuming and may result in errors or delays in relation to deployment of new software units in the layer stack.

With the present disclosure, deployment parameters such as an ordering behavior parameter and a reference parameter may allow one or more software units to be deployed into a layer stack based on the ordering behavior parameter and the reference parameter. The ordering behavior parameter and the reference parameter may be provided as part of a software package. The ordering behavior parameter and the reference parameter may indicate or suggest a desired location in the layer stack (e.g., relative to other software units in the layer stack) for the installation of the software unit. Accordingly, prior customizations, dependencies, or other modifications to software units in the layer that are layer order may be preserved such that updated, patched, or new software units may be easily deployed in the layer stack while helping to reduce or eliminate issues requiring repairs in response to the software unit being deployed in an unpredictable or undesirable matter.

Figure 1:
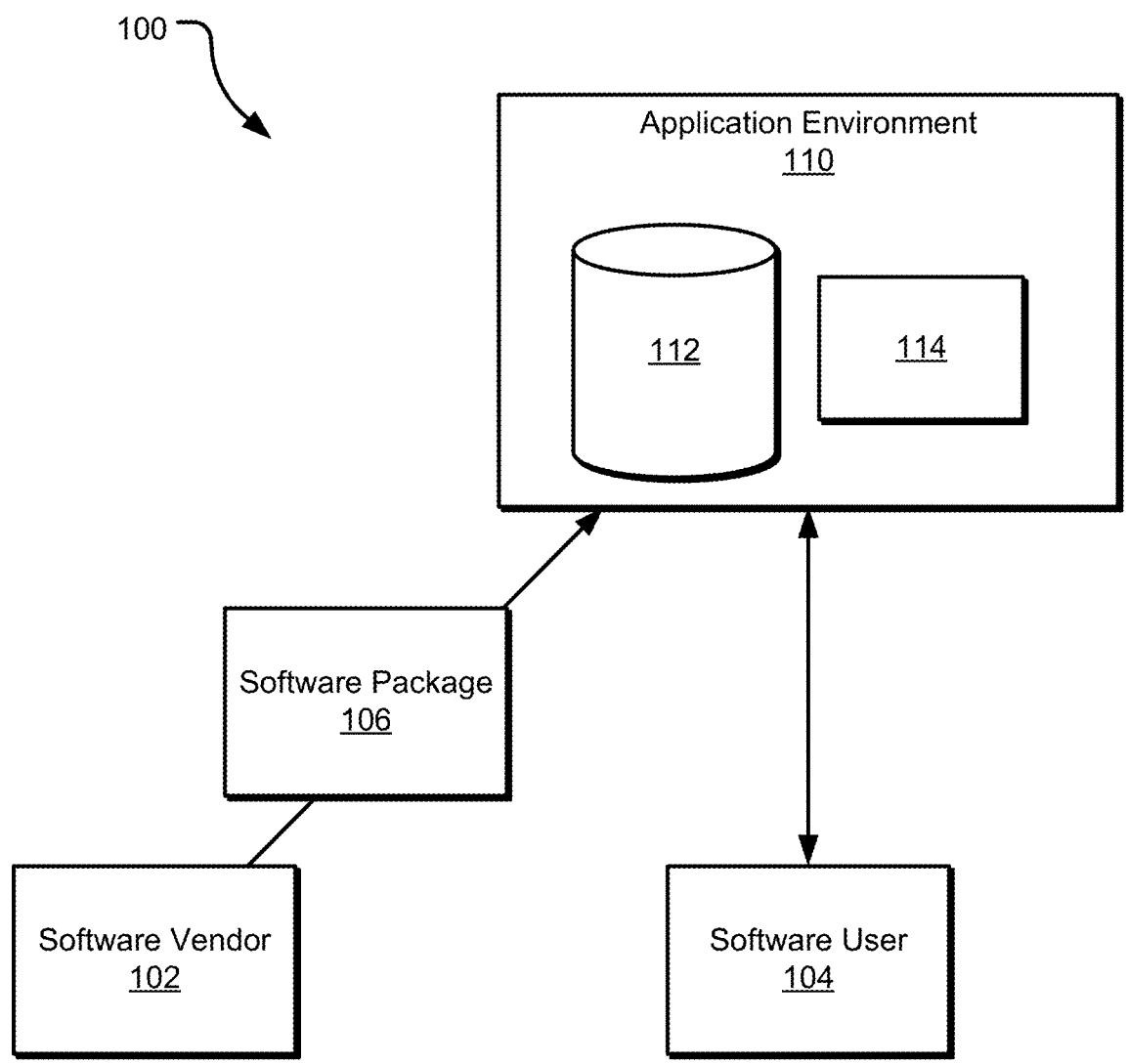
FIG. 1 depicts an example of a system comprising an application environment.

FIG. 1 depicts an example system 100 of the present disclosure. The present disclosure facilitates improvements in installing a software unit into a layer stack of an application platform 114 executed in the system 100. The system 100 may include an application environment 110. The application environment 110 may include a database 112 for storage of data. The data stored in the database 112 may be generated within the application environment 110 or may be imported or collected from other data sources. In some examples described herein, the application environment 110 may be a business application environment for execution of software functionality in relation to business data. However, while a business application environment 110 having business data stored therein may be discussed for purposes of illustration, the concepts described herein may be used in any application environment in which a layer stack is maintained for execution of software units comprising a software application.

Accordingly, the application environment 110 may also include an application platform 114. The application platform 114 may include one or more software applications executed by the application platform 114. The application platform 114 may comprise memory and/or processors. In this regard, the one or more software applications executing on the application platform 114 may be stored in the memory of the application platform 114 and executable by one or more processors of the application platform 114 (e.g., as facilitated by a processing device illustrated in FIG. 18). The application platform 114 may also comprise other resources (e.g., operating systems, data structures, etc.) that facilitate execution of the one or more software applications. Furthermore, the application platform 114 may be in operative communication with the database 112 to access the data stored in the database 112 to apply the one or more software applications to the data stored in the database 112.

One or more software users 104 may access the application environment 110. As described in greater detail below, the application environment 110 may provide a secure processing space accessible only by authorized software users 104. The software users 104 may access the application environment 110 to access the software application executed by the application platform 114. For example, the software users 104 may use the one or more software applications to perform analysis of the data in the database 112, generate metadata regarding the data in the database 112, generate and view reports regarding the data in the database 112, or perform other functions using the application platform 114 with the data in the database 112.

Furthermore, one or more software vendors 102 may deploy one or more software packages 106 into the application environment 110. The software package 106 may comprise one or more software units that may include software components. The software components of a software unit may be configured for providing specific functionality. For example, the software components of the software units deployed through the software package 106 may act on the data in the database 112 to perform any of the functions described above or to provide other functionality of the software application executed by the application platform 114 such as user interface functionality, communications functionality, or the like. In addition, the software package 106 provided by the software vendor 102 may supplement or customize base software functionality provided by the application environment 110, which may include providing a common data model upon which the software vendor 102 may build additional or configurable functionality for software units deployed by the software package 106. For instance, the common data model may relate to business data stored in a business application environment.

Figure 2:
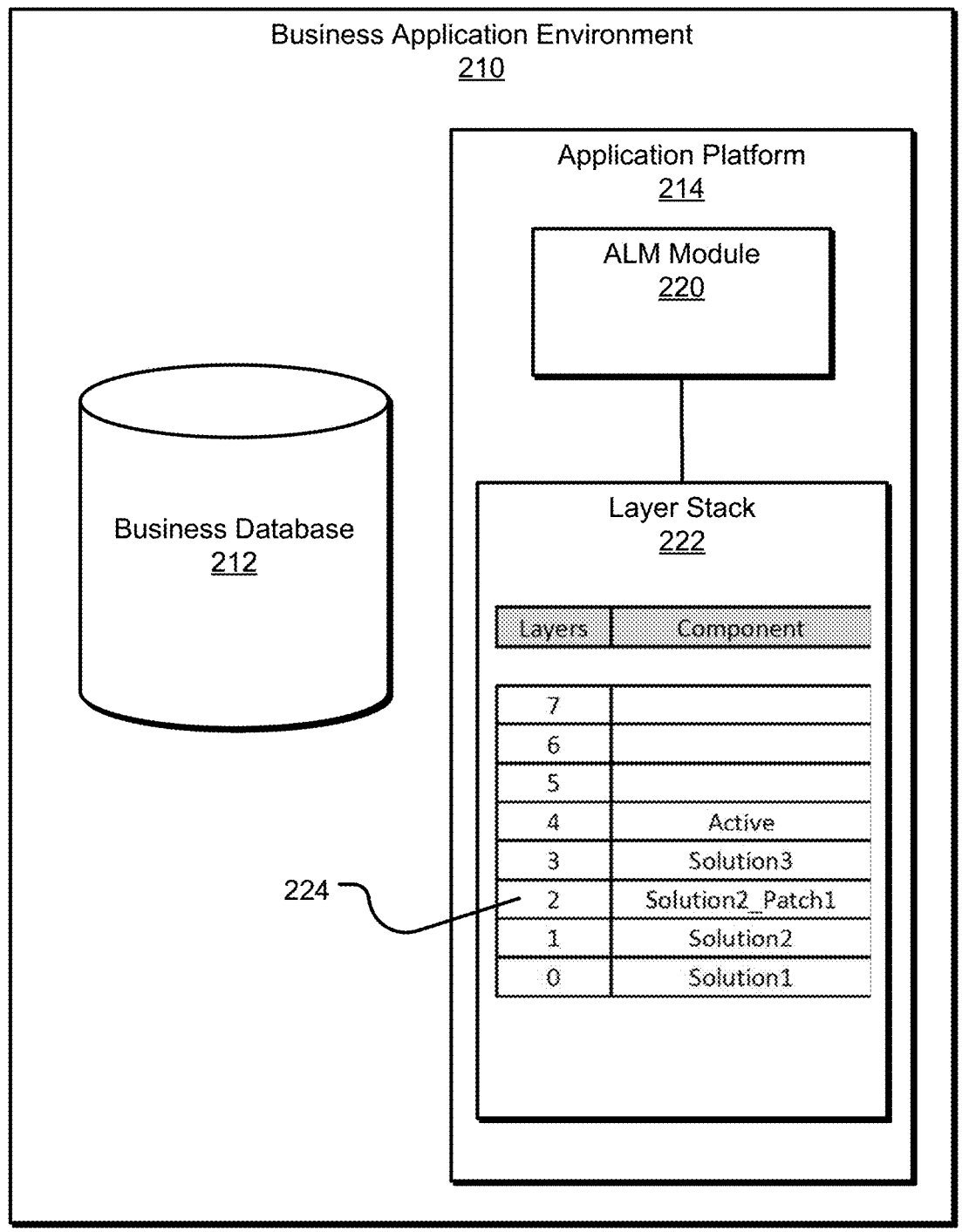
FIG. 2 depicts an example of an application environment in which an application comprising one or more software units in a layer stack may execute.

With further reference to FIG. 2, a more specific example of a business application environment 210 is depicted. Again, the business application environment 210 may include a business database 212 for storage of business data. The business application environment 210 may also include an application platform 214 according to the foregoing discussion of the application platform 114. The application platform 214 may include an application lifecycle management (ALM) module 220. The application platform 214 may also maintain a layer stack 222 that comprises a plurality of layers of software units 224. In the depiction shown in FIG. 2, each software unit 224 is represented as a row of a table with a layer number indicator and a software unit name. The software units 224 may each be configured for performing a given functionality either in relation to business data in the business database 212, metadata generated by other software units in the layer stack 222, or to provide other functionality. The layer stack 222 may define an order of operations such that software units 224 lower in the layer stack 222 are executed before software units 224 higher in the layer stack 222. In addition, a lower software unit 224 may pass metadata to a higher-order software unit 224 in the layer stack 222.

The ALM module 220 may be in operative communication with the layer stack 222 and may be operative to deploy a received software package comprising a software unit into the layer stack 222. For example, installation of a software unit 224 into the layer stack 222 may include installation of a new software unit 224 not previously present in the layer stack 222, upgrading an existing version of a software unit 224 with an update to the existing software unit 224, replacement of an existing software unit 224 with a new version of the software unit 224, installation of a patch for an existing software unit 224, or any other configuration, reconfiguration, deletion, or installation of a software unit 224 in the layer stack 222.

The description of the business application environment 210, the business database 212, and/or the business data in the present disclosure is intended to provide an example of a context in which the present disclosure may be utilized. However, the present disclosure may be more generally applicable to any software solution or software application in which a layered or ordered operation of software units may be executed and into which new software units are deployed into the layer stack 222. Moreover, while the layer stack 222 of the present disclosure is generally described with a "bottom-up" operation order in which lower software units in the application stack are executed before higher-level software units the application stack, the teachings of the present application could be similarly applicable to a "top-down" operation order without limitation.

While generally applicable to any ordered sequence of software unit execution, one particular context of the present disclosure may be the generation of a business application for operation with respect to business data stored in the business database 212. Such business applications may include, among other applications, customer relations management (CRM) applications or other enterprise resource planning (ERP) business applications. The business application environment 210 may maintain the business data in the business database 212 separately from the application platform 214. Such separation may facilitate a business application environment 210 in which software vendors (e.g., as shown in FIG. 1) may deploy software units having generic functionality into the application platform 214. By generic functionality, it is meant that the software units may perform a specific function in relation to data without the software vendor having a priori knowledge of, or access to, the business data on which the software unit executes. Thus, the business data in the business database 212 may be maintained securely without providing access to the software vendor. Instead, the software vendor may develop software units that apply a given functionality to whatever business data is contained in the business database 212 of the business application environment 210 into which the software unit is deployed without a priori knowledge of the business data. This generic functionality may be facilitated by a common data model employed by the business application environment 210. By having knowledge of the common data model, software vendors may be able to generate software units having a desired functionality that is predictably applied to the business data in view of the common data model. In this regard, generic function software units may be deployed into the application platform 214 to configure the application platform 214 to perform a specific business application function in relation to the business data in the business database 212.

As noted above, the business application environment may include a base set of functionality and standard data formats that provide a data configuration for typical business data scenarios. Such base set of functionality may include the common data model that allows software developers to develop generic function software units. The base set of the business application environment 210 may also allow software units to build upon or modify the base set of functionalities such that the business application environment 210 may be specifically configured to a given business's needs. One example of a business application environment 210 according to the present disclosure is the Microsoft® Power Platform provided by Microsoft Corporation of Redmond, Wash. In any regard, the business application environment 210 may provide a common data model to allow for manipulation, analysis, or other management business data of the business database 212.

In addition, the base set of the business application environment 210 may also comprise base tools that allow for securing the business application environment 210 such that only authorized software users may have access to the business application environment 210. Only authorized users may access and/or otherwise utilize software applications executed in the application platform 214 or otherwise access the business data in the business database 212. As such, the business application environment 210 may be specifically configured for a specific business, business unit, department, or other granular instance of a business entity to provide secure access to the business application environment 210.

The business application environment 210 may be configured to execute using storage and processing resources at a given location such as a data center or the like. Additionally or alternatively, components of, or the entirety of, the business application environment 210 may be configured as one or more cloud-based instances having computational and storage resources. The cloud-based instances may be co-located at a single location or may comprise pooled resources from a plurality of remote locations that may coordinate to provide a secure computing environment in which the business application environment 210 may be executed. In this regard, software units in a layer stack of a software application executing in the application platform 214 may comprise web service components, locally installed software on media at the application platform 214, or a combination thereof.

While the common data model may provide predictable behavior of the application platform 214 to provide functionality with respect to business data, it may be appreciated that different businesses or different business users may desire to use a software application in different ways. For instance, different businesses may desire different data analysis types and/or desire to measure different key performance indicators. Thus, while at least some software units 224 deployed into the layer stack 222 of the application platform 214 may be base software units that are provided with the business application environment 210, software units 224 may also comprise customizations, feature enhancements, feature extensions, or other customized or configurable software units that are deployed into the application platform 214 of a specific business application environment 210.

The software units 224 may comprise software components to facilitate application functionality. The software units may allow for application of a set of software customizations to existing business application environment 210 functionality or may provide new functionality not previously facilitated by the base set of the business application environment 210. A software unit 224 may contain one or more software components such as site maps, tables, processes, web resources, choices, software flows, or other software functionality.

Figure 3:
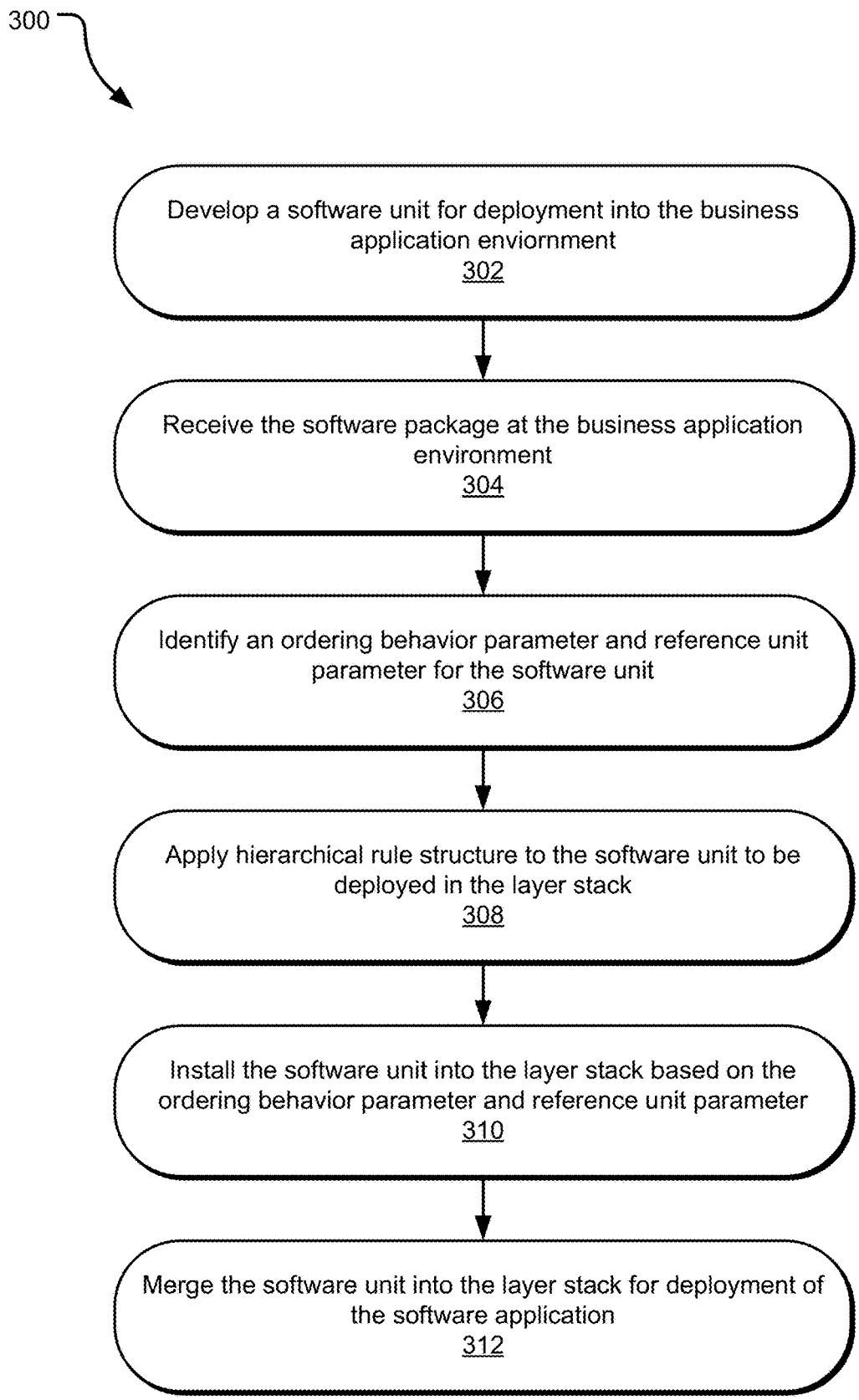
FIG. 3 depicts example operations for installing the software package in an application environment.

FIG. 3 depicts example operations 300 for installing a software unit into a layer stack of an application platform of a business application environment. The operations 300 may include a developing operation 302. The developing operation 302 may include development of the software unit to be deployed into the layer stack by a software vendor, provider of the business application environment, a software user, or other entity with appropriate knowledge of the application platform. During the developing operation 301, the software package containing the software unit to be deployed to the layer stack may be provided with deployment parameters including, for example, an ordering behavior parameter and a reference parameter.

The operations 300 may also include a receiving operation 304 in which a software package is received at the business application environment. Security protocols may govern the provision of a software package to a business application environment to ensure only authorized software packages are received and/or processed. An identifying operation 306 may be performed to identify an ordering behavior parameter and a referencing a parameter from the software unit. For example, the identifying operation 306 may be performed by the ALM module of an application platform.

Figure 4:
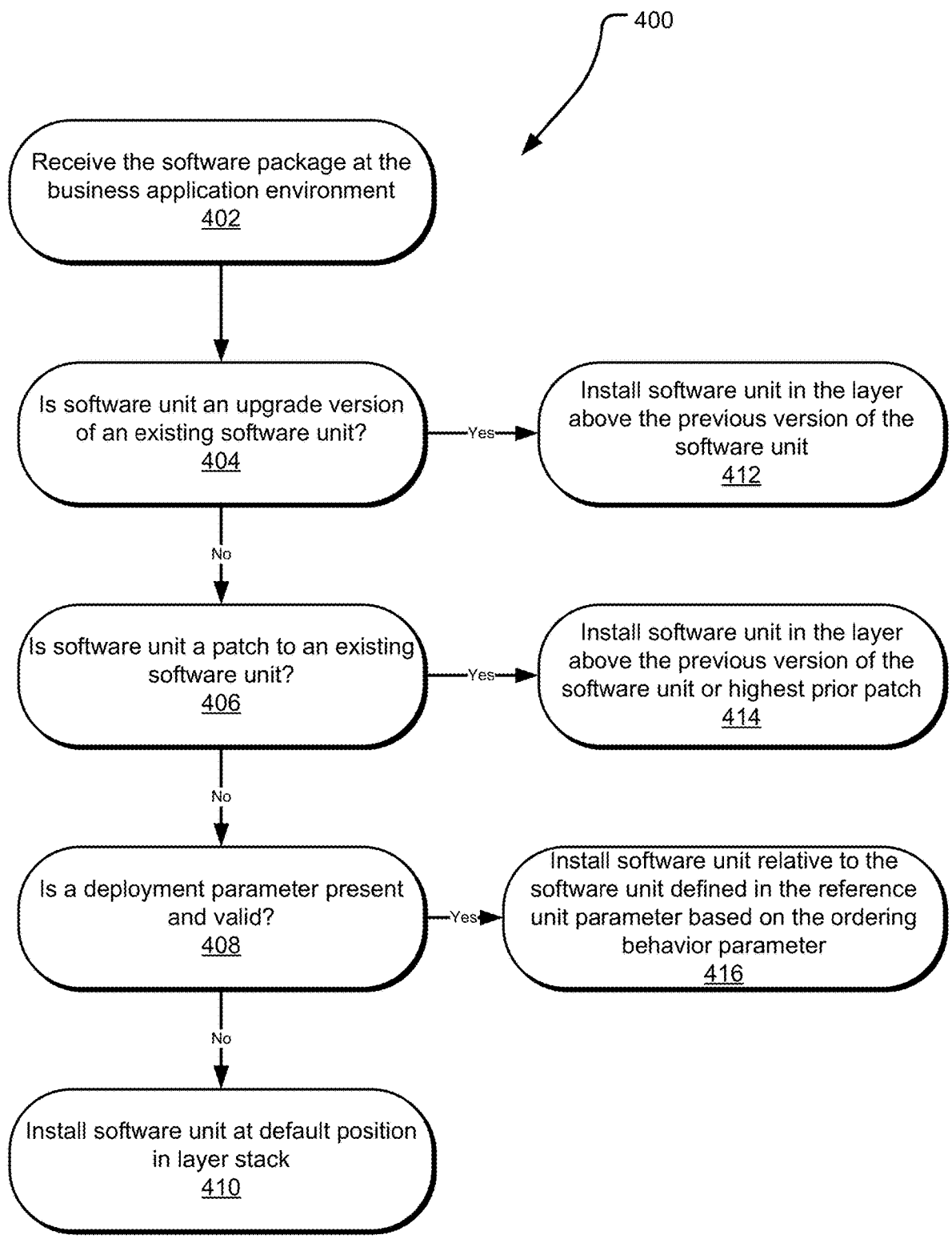
FIG. 4 depicts example operations of a hierarchical rule structure applied to a software unit when installing the software unit into a layer stack.

The operations 300 may further include application of a hierarchical rule structure on the software unit to be installed in the layer stack at an applying operation 308. Additional details regarding an example of a hierarchical rule structure are provided in FIG. 4 below. In FIG. 3, it may be assumed that no higher-order installation rules are applicable, and the operations 300 include an installing operation 310 such that the software unit is installed into the layer stack based on the ordering behavior parameter and the reference parameter identified in the identifying operation 306. As will be described in greater detail below, the reference parameter may indicate a software unit that, if the software unit exists in the layer stack, is used as a reference for installation of the new software unit relative to the reference software unit identified by the reference parameter. That is, the ordering behavior parameter may provide the relative layer position to install the new software unit in relation to a software unit referenced by the reference parameter. In other examples, a given deployment parameter may define both a target layer in a layer stack and an indication of relative placement relative to the target layer. Therefore, even in contexts where an ordering behavior parameter and a reference parameter are discussed discretely, it may be appreciated that these parameters may be provided in a single parameter value without limitation.

The operations 300 may also include a merging operation 312 in which the software unit may be merged into the layer stack to deploy the software application, including the newly deployed software unit in the merging operation 312. The merging operation 312 may include establishing dependencies or other metadata links between the newly installed software unit and the existing software units in the layer stack.

As noted above, FIG. 4 depicts example operations 400 related to a hierarchical rule structure for deployment of a software unit into a layer stack of a business application environment. The operations 400 may include a receiving operation 402 in which a software package is received at the business application environment. The software package may be received and processed by an AML module of the business application environment. The ALM module may apply the hierarchical rule structure depicted in FIG. 4. In any regard, the hierarchical rule structure described in FIG. 4 may be used to determine an installation location in a layer stack in which the software unit contained in the software package may be installed. For example, determining operation 404 may determine whether the software unit is an upgrade to an existing software unit. If it is identified that the software unit included in the software package is an upgrade, an upgrade rule may apply in which the software unit is installed in the layer above the previous version of the software unit in the layer stack at the installation operation 412. In addition, the upgrade rule may apply to a differential upgrade, which may be installed at the layer above the existing software unit. A differential upgrade may only affect a portion of the existing software unit. In addition, the upgrade may include a replacement version of an existing software unit, which may be installed in place of the existing software unit.

If, however, it is determined at the determining operation 404 that the software unit is not an upgrade to an existing software unit in the layer stack, the operations 400 may proceed to determining operation 406. Determining operation 406 determines whether the software unit is a patch to an existing software unit in the layer stack. A patch rule may indicate that a patch to an existing software unit in the layer stack is to be installed in a layer position directly above the patched software unit, including any prior patches for the software unit. If it is determined at 406 that the software unit is a patch to an existing software unit in the layer stack, an installation operation 414 may be performed such that the software unit is installed to the layer above the previous version of the software unit related to the patch or the highest prior patch layer for the given software unit to be patched according to the patch rule.

If it is determined the software unit is not a patch in the determining operation 406, the operations 400 may proceed to a determining operation 408 in which it is determined whether one or more deployment parameter for the software unit is contained in the software package and valid. For example, the determining operation 408 may include determining if one or more software units named as reference parameters are present in the layer stack. If it is determined in the determining operation 408 that the deployment parameter is present and valid, an installing operation 416 may be performed to implement a deployment rule using the deployment parameters that define a suggested installation location in the layer stack. The installing operation 416 may include installing the software unit of the software package relative to the existing software units identified in the layer stack based on the reference parameter for the software unit.

In addition, the installation location of the software unit may be determined by the ordering behavior parameter. That is, the reference parameter may identify one or more existing software units in the layer stack. The ordering behavior parameter may indicate a relative position where the software unit to be installed relative to the existing software unit of the reference parameter. Examples of potential ordering behavior parameters include an above value, a below value, a between value, a top of stack value, or a bottom of stack value. An above value results in the software unit being installed in a layer position above (e.g., in the layer position directly above) the highest referenced existing software unit identified by the reference parameter. A below value results in the software unit being installed in a layer position below (e.g., in the layer position directly below) the lowest referenced existing software unit identified by the reference parameter. A between value results in the software unit being installed in a layer position between existing software units identified in the reference parameter. A top of stack value may result in the software unit being installed at the top layer of the layer stack regardless of the identity of the existing software units in the layer stack. A bottom of stack value may result in the software unit being installed at the bottom layer of the layer stack regardless of the identity of the existing software units in the layer stack. Further still, the ordering behavior parameter may indicate a suggested install location relative to a layer in the layer stack. In certain examples, universal software units may be commonly deployed, executed by default, or be required to be included in the stack. For example, such universal software units may include a base layer defining certain base level functions for an application, an active layer providing customizations for an application, or a system layer providing core system functionality. In turn, an ordering behavior parameter may include a positioning suggestion relative to such a layer including, for example, "aboveBase" to suggest install of a software unit above a base layer, "belowActive" to suggest install of a software unit below an active layer, etc. This provides an example in which a single deployment parameter may suggest a target layer and an installation location relative to the target layer. Also, while described in the context of universal layers, the ordering behavior parameter could also reference any layer in the layer stack such a combined deployment parameter.

If it is determined that a deployment parameter is not present or not valid (e.g., the software unit or units referenced by the reference in a parameter are not contained in the software layer stack), the operations 400 may include a default installation operation 410 in which the software unit is installed in the layer stack in a default position according to a default installation rule. The default position may be the top layer of the software layer stack, the bottom layer of the software layer stack, or some other predetermined position in the software layer stack in which software units are deployed in which no other of the hierarchical rules apply for installation of the software unit.

Any appropriate coding approaches may be used to provide the ordering behavior parameter and reference parameter without limitation. As an example of one schema, the deployment parameters may be provided with the following definition represented in XML format:

```
<desiredlayerorder behavior=" below">
    <referenceunit uniquename="Unit_1"/>
    <referenceunit uniquename="Unit_2"/>
</desiredlayerorder>
```

In this format, the ordering behavior parameter value may be any of the values described above. Also, any software unit may be referenced as a "reference unit" by providing the unique name of the software unit to be referenced in the reference parameter.

Example cases illustrating applications of the hierarchical rule structure are depicted in FIGS. 5-16. In each of these figures, an initial layer stack and a final layer stack are depicted. That is, the initial layer stack indicates the state of the layer stack prior to receipt of the illustrated software package, and the final layer stack indicates the resulting layer stack after application of the hierarchical rule structure to install the software unit of the software package. In this regard, FIGS. 5-16 may each depict a software package deployed into a business application environment to modify an initial layer stack to a final layer stack. As such, in FIGS. 5-16 other components of the business application environment are omitted for clarity. However, the foregoing disclosure including use of an ALM module for deployment of a software unit may be applicable. In addition, software units are referred to as "solutions" in FIGS. 5-16; however, the software units may be provided according to any of the foregoing descriptions.

Figure 5:
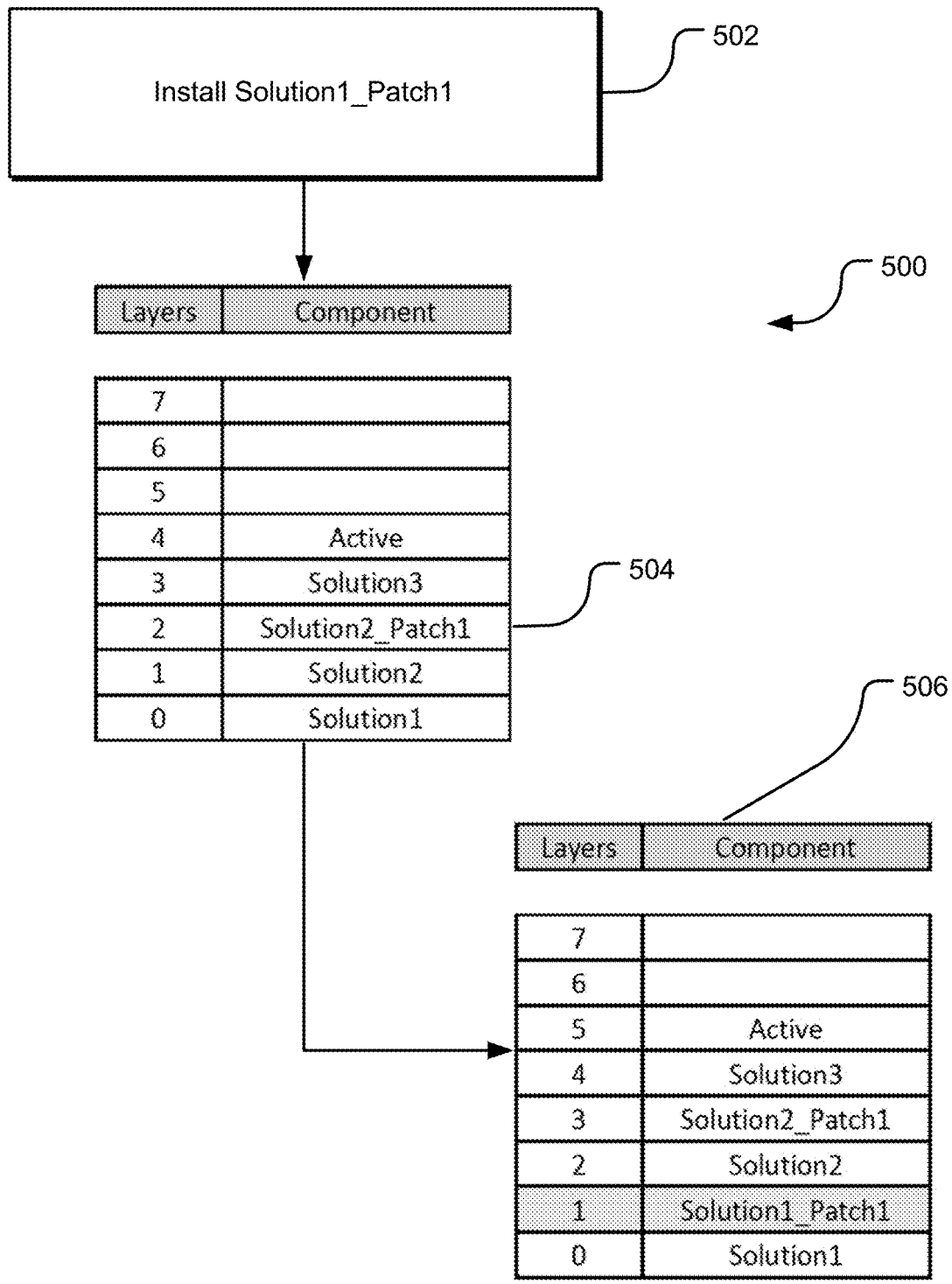

With reference to example 500 depicted in FIG. 5, a software package 502 is received that includes a software unit, Solution1_Patch_1. In FIG. 5, a patch rule (e.g., according to determining operation 406) may be applicable such that the software unit of the software package 502 is determined to be a patch to Solution1 in the initial layer stack 504. In turn, the software unit may be installed in the final layer tack 506 in a layer above existing Solution1 by virtue of the patch rule applying to install Solution1_Patch1 above the software unit it patches (e.g., according to installation operation 414).

Figure 6:
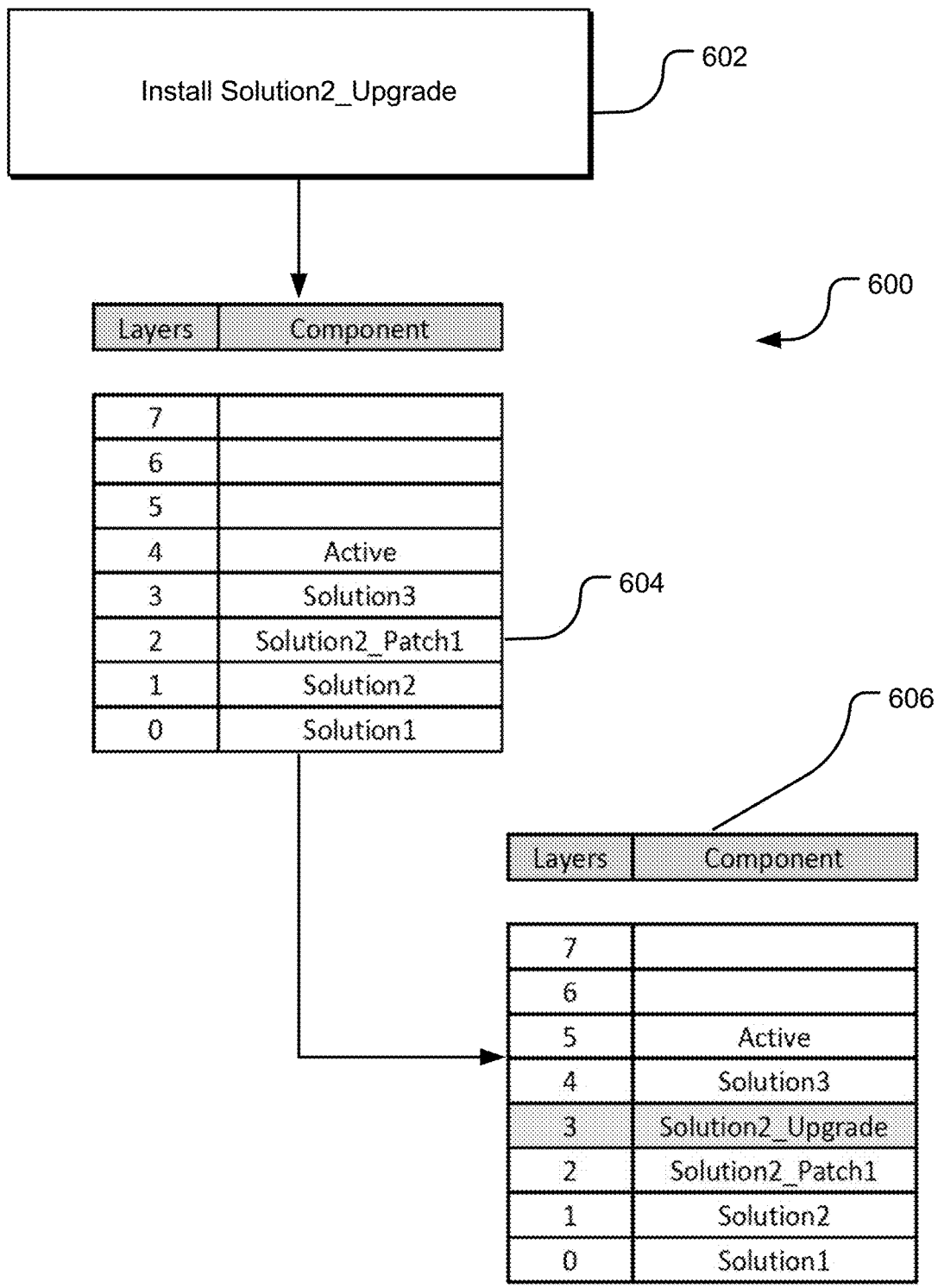

FIG. 6 depicts an example 600 in which a software package 602 includes a software unit, Solution2_Upgrade, comprising an upgrade to Solution2 in an initial layer stack 604. The initial layer stack 604 having Solution2 at layer 1 is shown. A final layer stack 606 is depicted where the Solution2_Upgrade software unit is installed at layer 3, the layer above the existing software unit Solution2 and the most recent patch thereof, Solution2_Patch1. In this regard, an upgrade rule (e.g., determining operation 404) may be applicable to install the software unit in the layer above the previous version of the software unit (e.g., according to installation operation 412).

Figure 7:
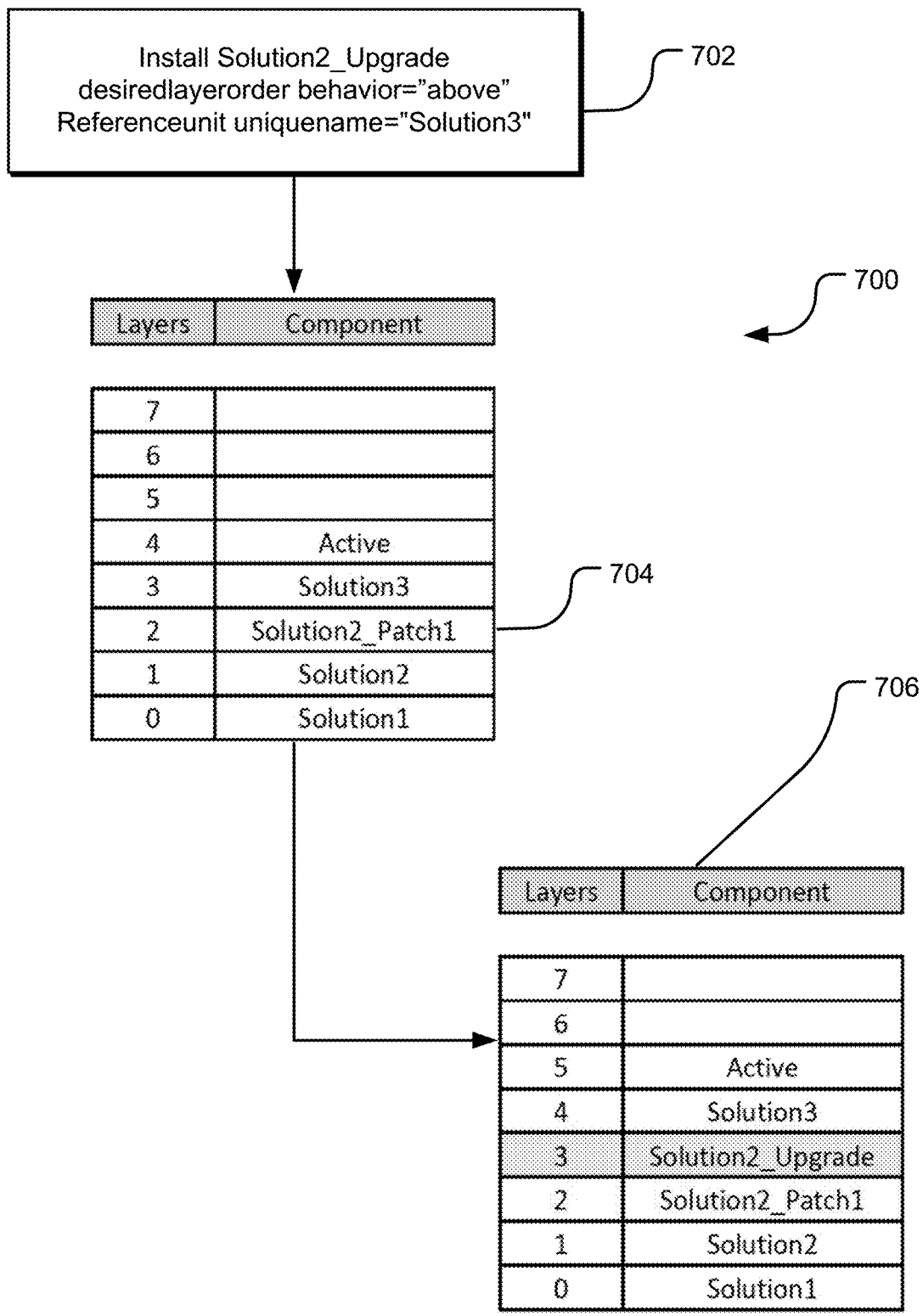

FIG. 7 depicts an example 700 of a software package 702 that includes a software unit, Solution2_Upgrade, that is an upgrade to Solution2 in the initial layer stack 704. The software package 702 also includes deployment parameters, including an ordering behavior parameter of "above" and a reference parameter of "Solution3." The initial layer stack 704 is depicted in which Solution2 resides at layer 1 and a patch, Solution2_Patch2, to Solution2 resides on layer 2. In the final layer stack 706, the Solution2_Upgrade software unit may be installed at layer 3 above both Solution2 at layer 1 and Solution2_Patch1 layer 2. In this regard, while the software package 702 included an ordering behavior parameter and a reference parameter, because the upgrade rule (e.g., according to determining operation 404) applied as a higher-order rule than the directed deployment rule (e.g., according to determining operation 408), the software unit contained in the software package 702 may be installed according to the upgrade rule (e.g., according to installation operation 412) rather than the directed deployment rule.

Figure 8:
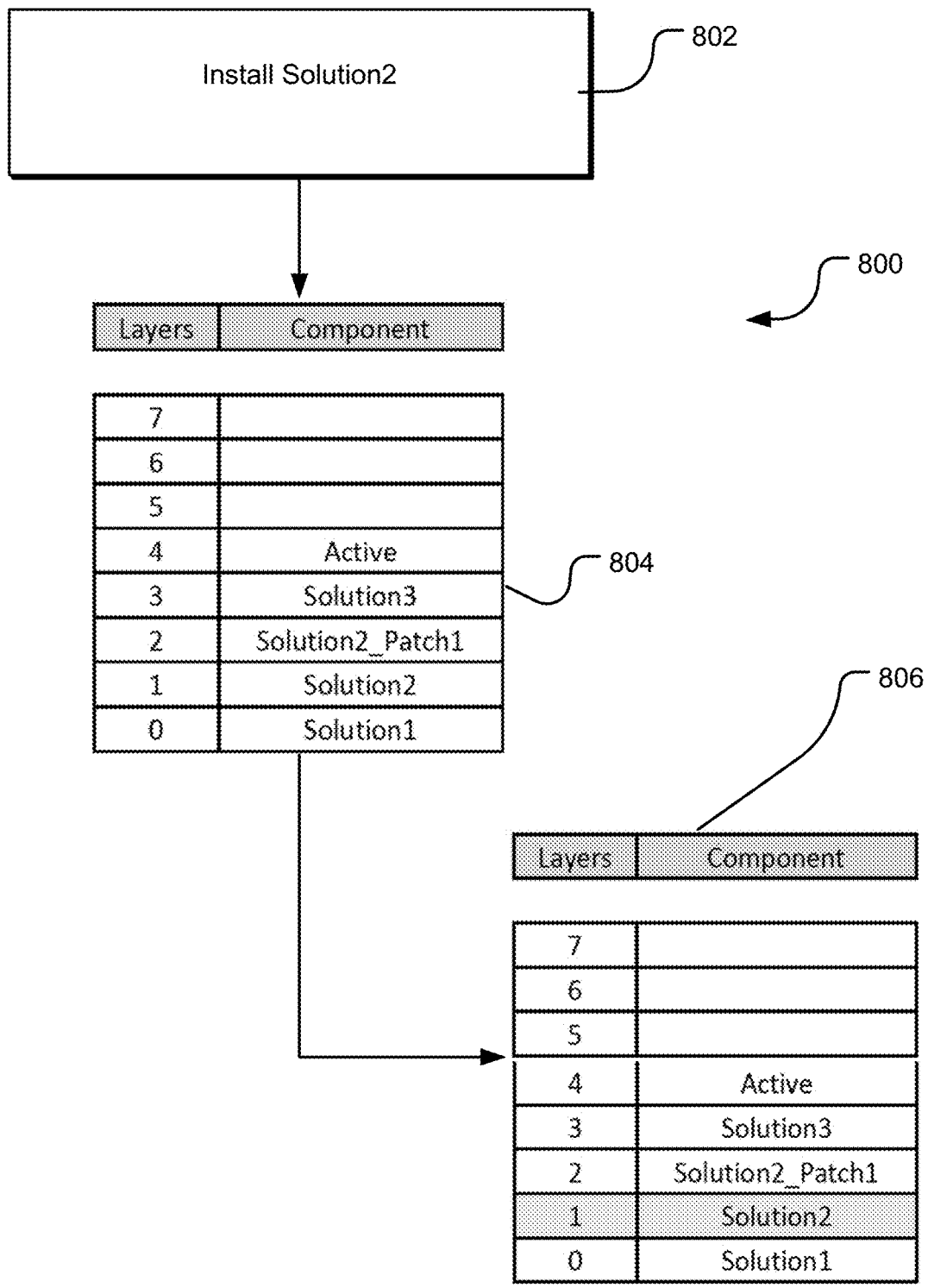

FIG. 8 depicts an example 800 in which a software package 802 includes a software unit corresponding to Solution2. An initial layer stack 804 is depicted with Solution2 residing at layer 1. A final layer stack 806 is depicted in which the Solution2 software unit is installed at layer 1 to replace the existing Solution2. That is, the upgrade rule may apply in this example 800. Solution2 may be indicated as a full replacement of the existing Solution2 software unit rather than a differential upgrade only affecting some components of Solution2.

Figure 9:
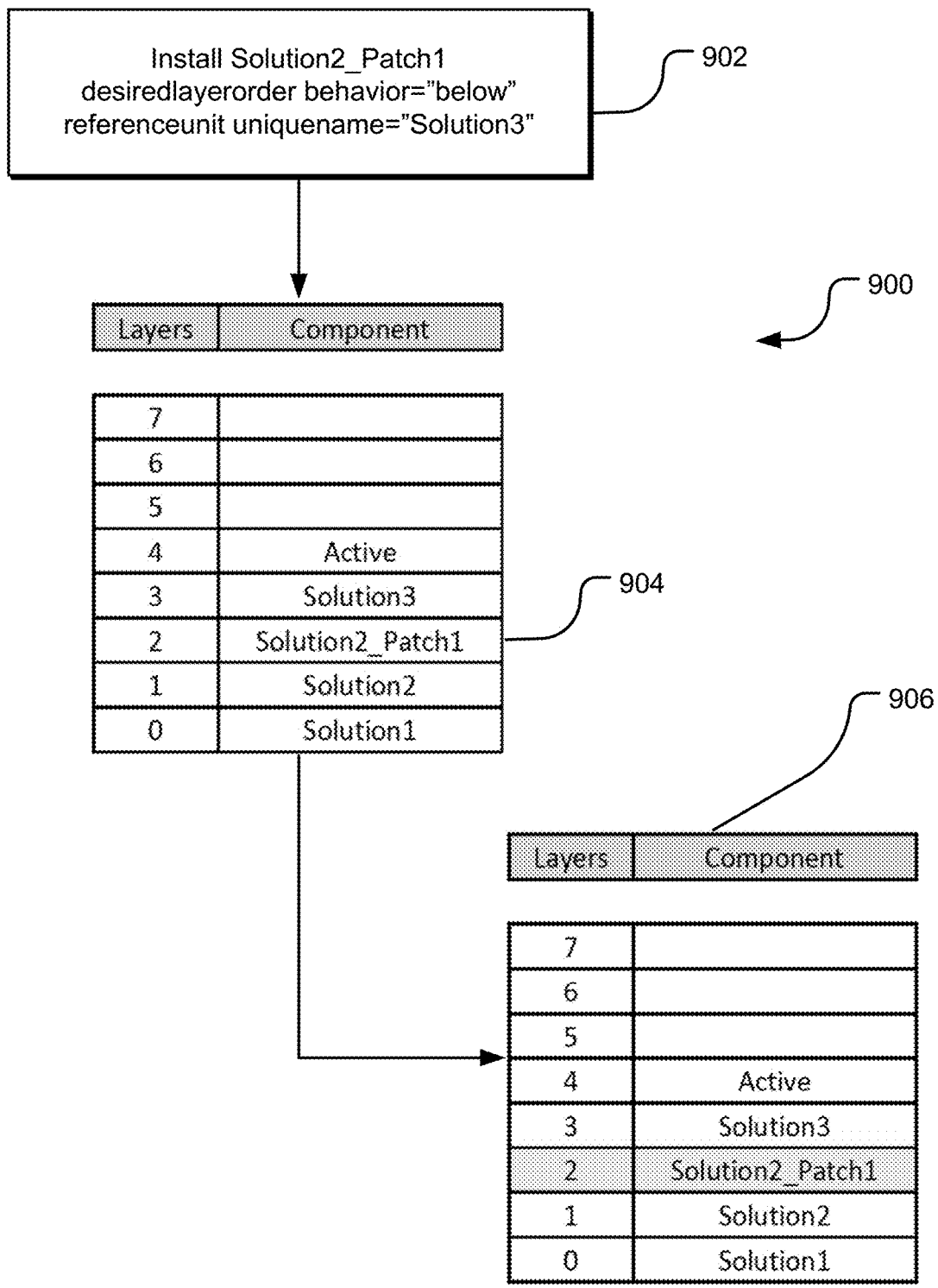

FIG. 9 depicts example 900 in which a software package 902 includes a software unit, Solution2_Patch1, that is a patch to Solution2. In addition, the software package 902 includes an ordering behavior parameter of "below" and a reference parameter of "Solution3." However, because the software unit of the software package 902 is a patch to an existing solution in the initial layer stack 904, the final layer stack 906 may install the Solution2_Patch1 software unit above the software unit that is being patched, i.e., above Solution2 at layer 2. In this regard, the patch rule may apply even though the software package 902 included deployment parameters that included a valid reference parameter as the patch rule may apply as a higher-order rule than the directed deployment rule.

Figure 10:
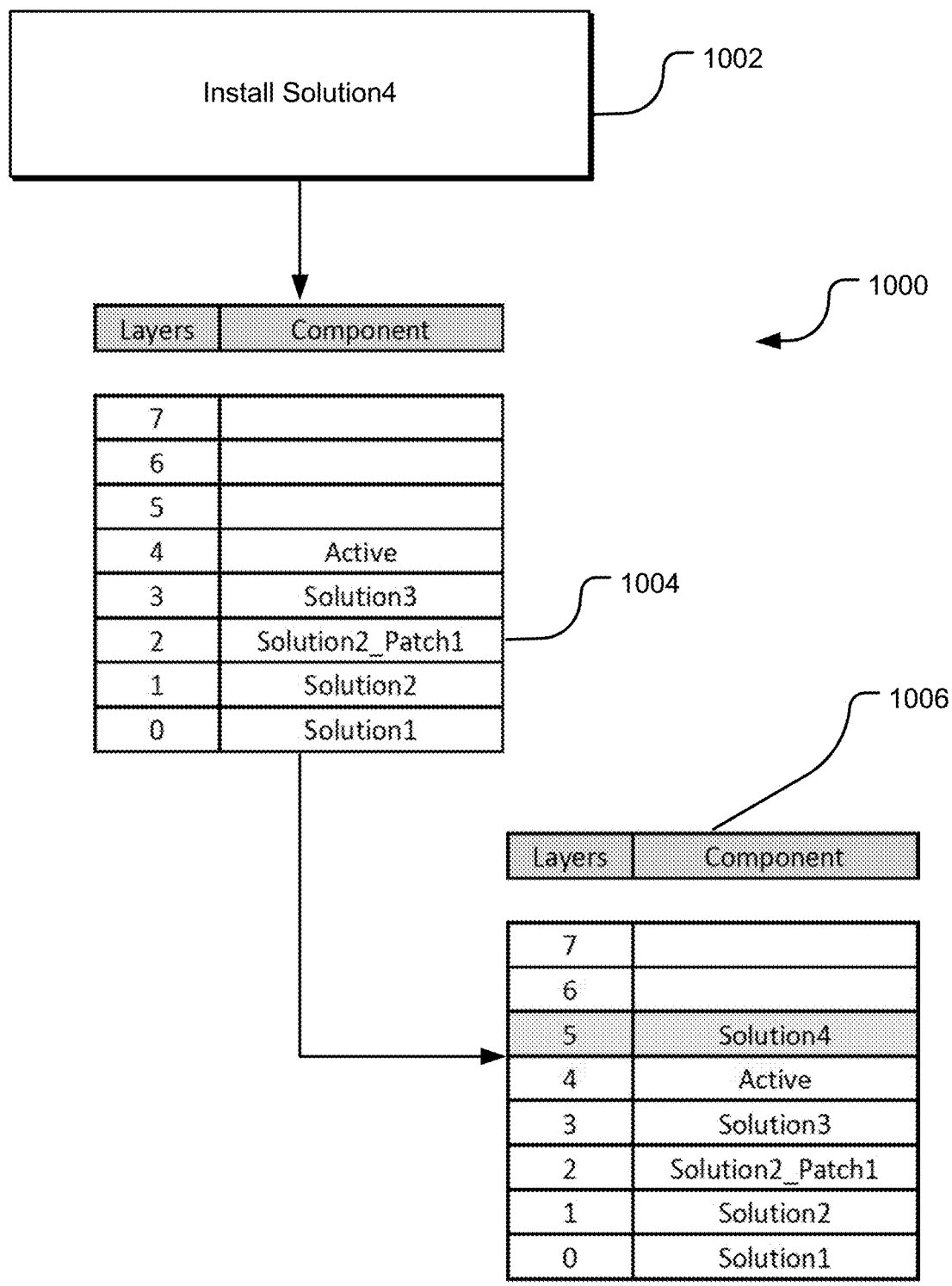

FIG. 10 depicts an example 1000 in which a software package 1002 includes a software unit, Solution4. As shown in an initial layer stack 1004, no existing Solution4 exists. However, the software package 1002 does not include deployment parameters. In turn, none of the upgrade rule, patch rule, or directed deployment rules apply. Accordingly, Solution4 is shown in the final layer stack 1006 is being installed in the default position in the final layer stack 1006, which in the depicted example 1000 is the top layer of the final layer stack 1006 at layer 5.

Figure 11:
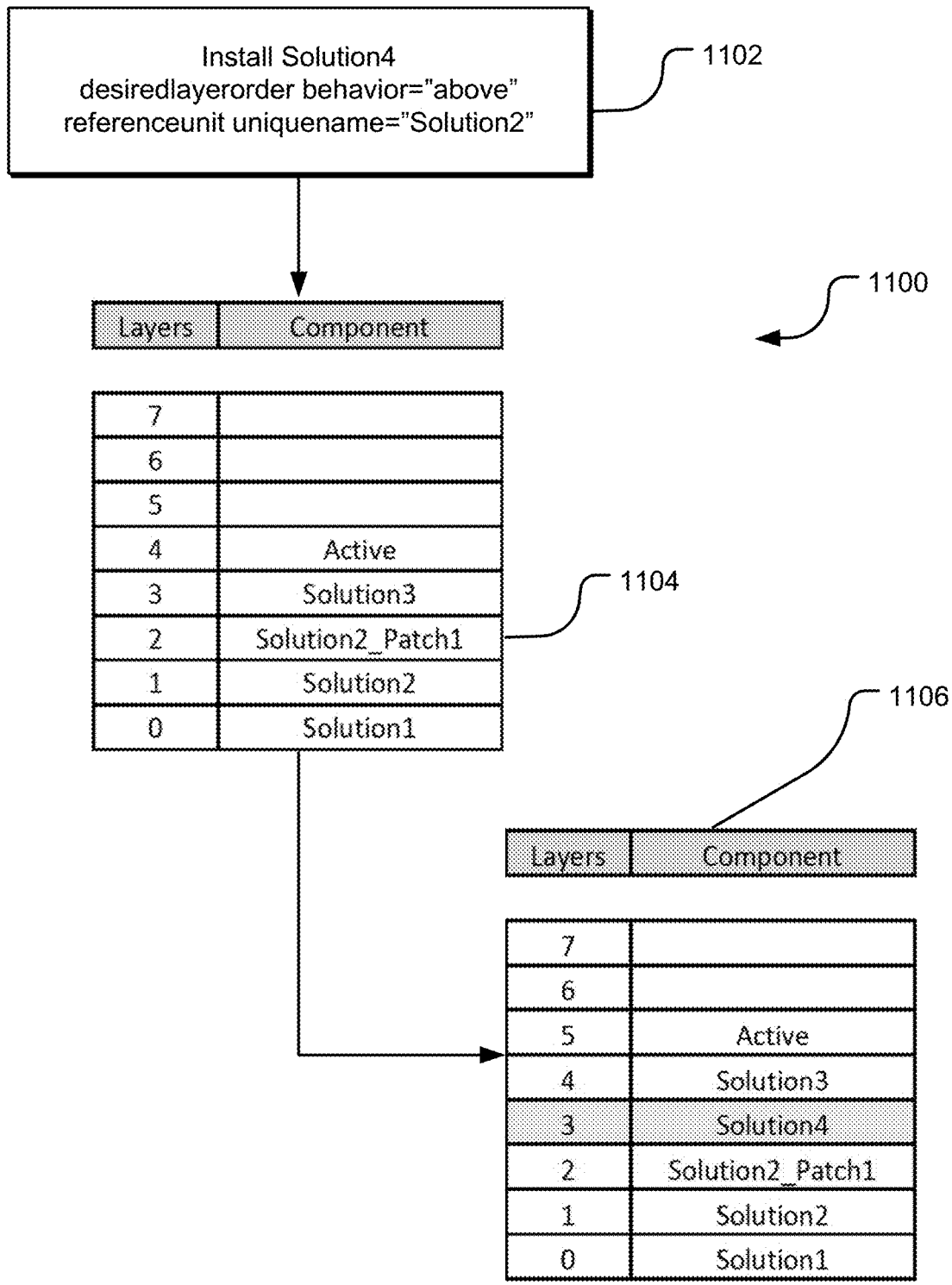

FIG. 11 depicts an example 1100 in which a software package 1102 includes a software unit, Solution4. The software package 1102 also includes deployment parameters, including an ordering behavior parameter of "above" and a reference parameter of "Solution2." Because the initial layer stack 1104 does not include a software unit corresponding to Solution4, it may be determined that Solution4 is not an upgrade or a patch. However, the initial layer stack 1104 does include Solution2 at layer 1. Accordingly, the directed deployment rule applies as there is a valid referenced software unit in the initial layer stack 1104. Accordingly, as shown in the final layer stack 1106, the software unit Solution4 may be installed at layer 3 above both Solution2 and the patch for Solution2, Solution2_Patch1, based on the directed deployment rule and the deployment parameters contained in the software package 1102. That is, Solution4 is installed above Solution2 in the final layer stack 1106 based on operation of the directed deployment rule (e.g., according to installing operation 416).

Figure 12:
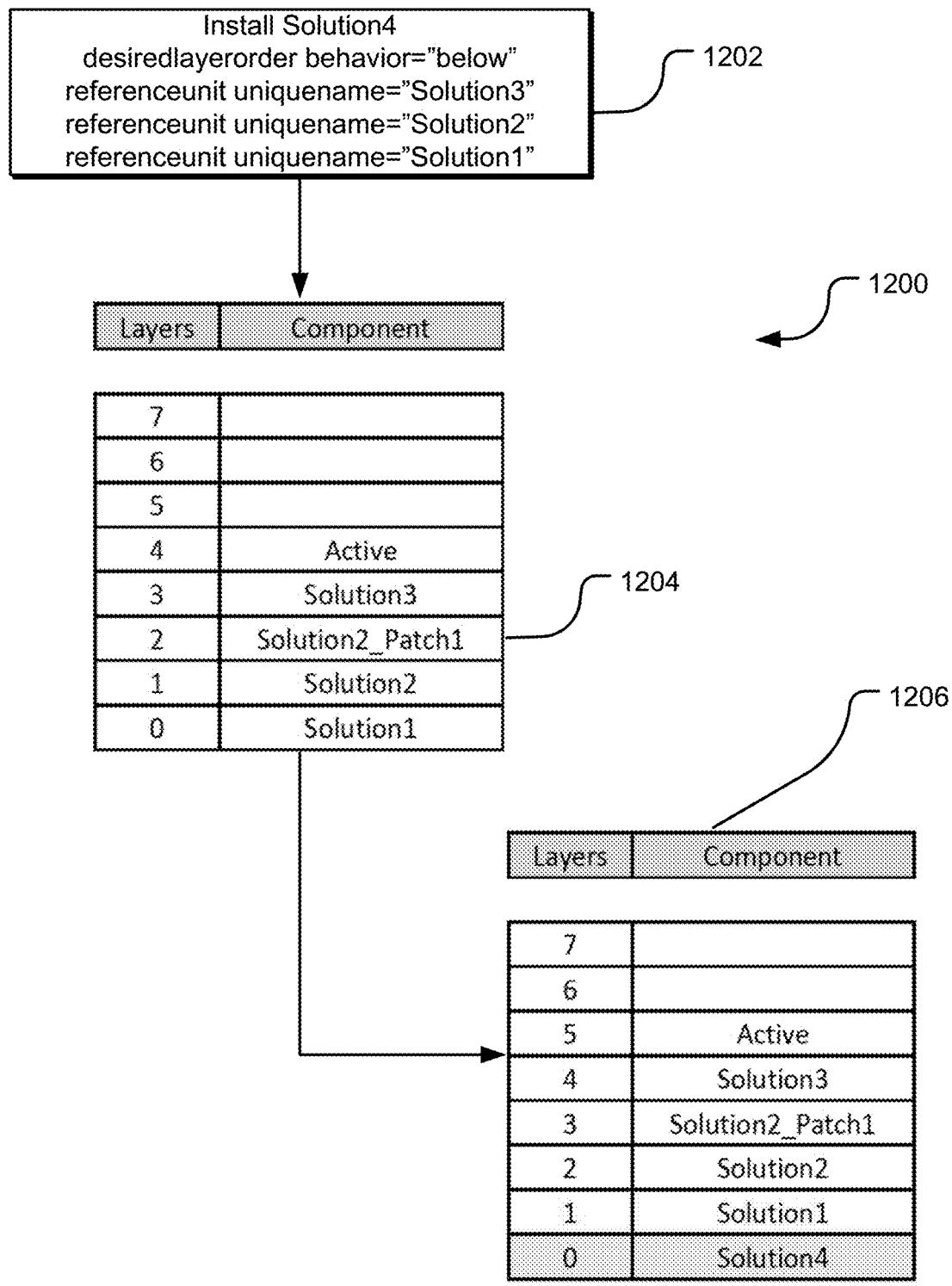

FIG. 12 depicts an example 1200 in which a software package 1202 includes a software unit Solution4. The software package 1202 includes deployment parameters, including ordering behavior parameter of "below" and reference parameters comprising each of "Solution3," "Solution2," and "Solution1." In example 1200, Solution4 may be determined not to be an upgrade or a patch to an existing solution in the initial layer stack 1204. As such, the upgrade rule and patch rule do not apply. However, the directed deployment rule does apply, and Solution4 is installed below each of the software units identified in the reference parameters in the software package 1202. As such, Solution4 is installed in the final layer stack 1206 at layer 0, below each of Soluition3, Solution2, and Solution1.

Figure 13:
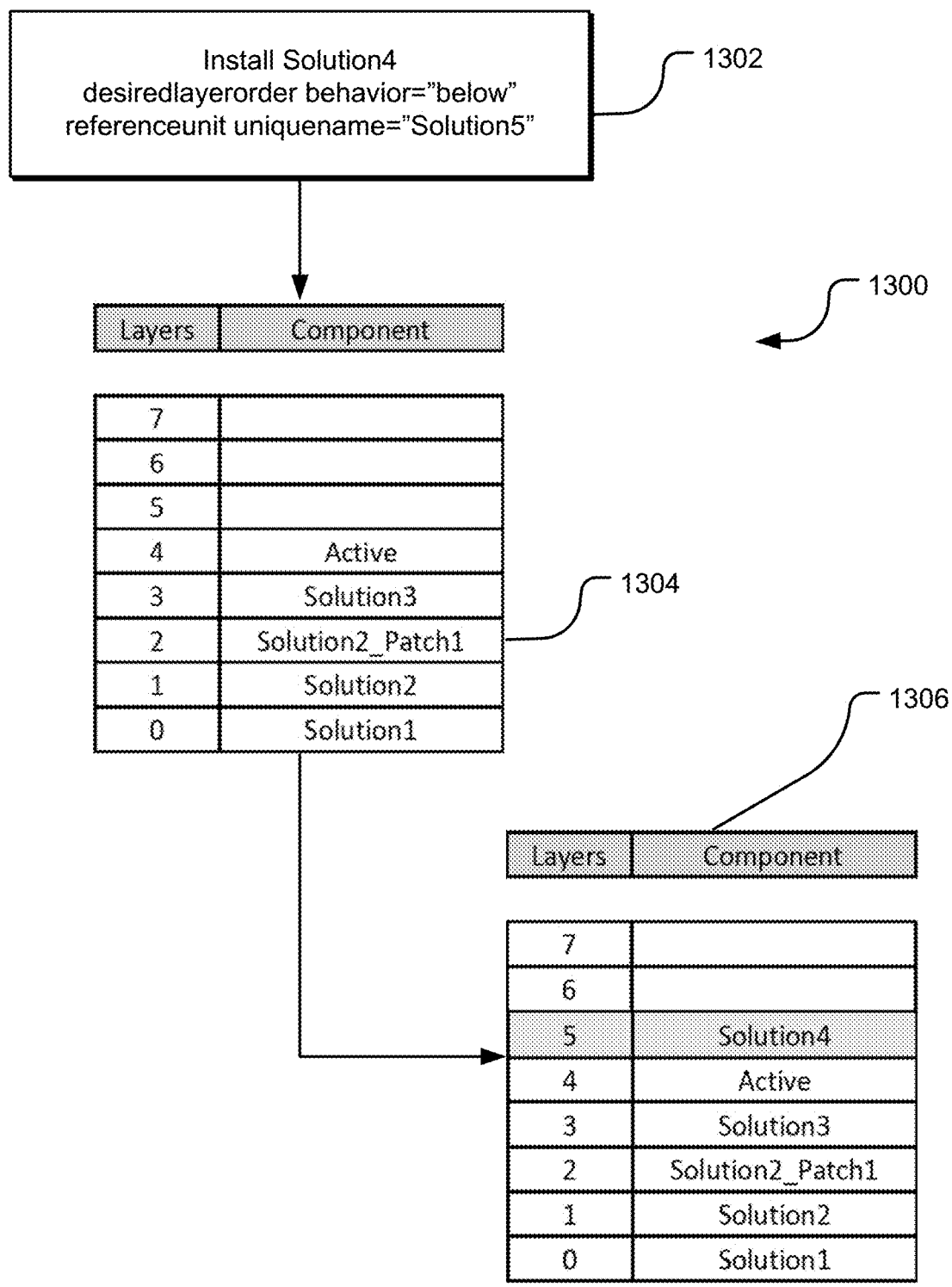

FIG. 13 depicts an example 1300 of a software package 1302 that includes a software unit Solution4. Software package 1302 also includes deployment parameters, including an ordering behavior parameter of "below" and a reference parameter of "Solution5." As can be seen from an initial layer stack 1304, neither Solution4 nor Solution5 exists in the initial layer stack 1304. As such, because Solution4 is not an upgrade or a patch to an existing software unit in the initial layer stack 1304, it is determined whether the reference parameter of the software package 1302 is valid. In this case, because no Solution5 exists in the initial layer stack 1304, the directed deployment rule does not apply. Instead, a default rule applies, and Solution4 is installed in a default location in the final layer stack 1306. In the example 1300 depicted in FIG. 13, the default position for the default rule is the top of the layer stack, which results in Solution4 being installed at layer 5 at the top of the final layer stack 1306.

Figure 14:
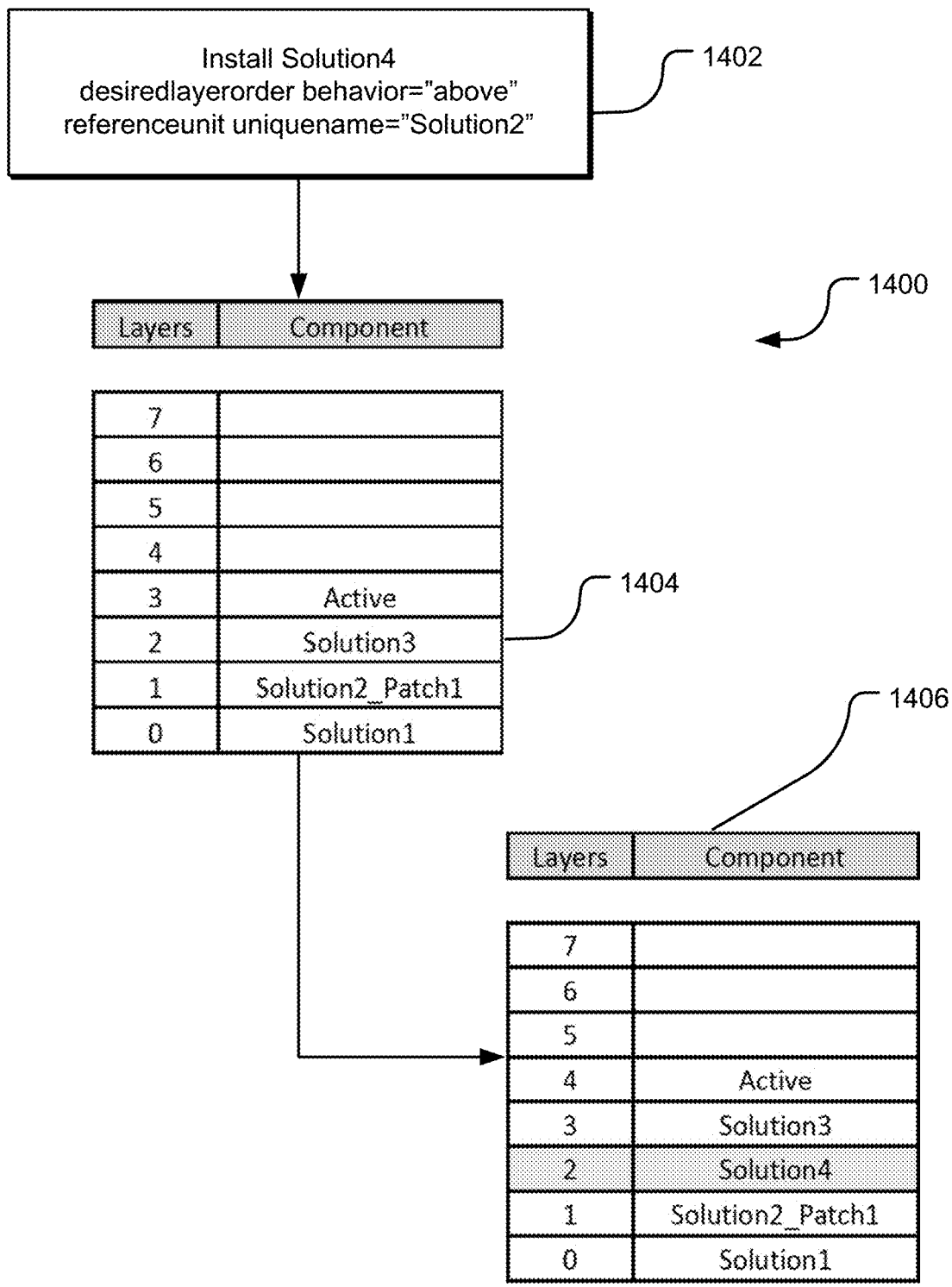

FIG. 14 depicts an example 1400 in which a software package 1402 includes a software unit Solution4. The software package 1402 also includes deployment parameters, including an ordering behavior parameter "above" and a reference parameter "Solution2." As can be seen in the initial layer stack 1404, Solution4 does not exist in the initial layer stack 1404. As such, it may be determined that Solution4 is not an upgrade to an existing software unit in the initial layer stack 1404. Also, Solution4 may be determined not to be a patch to an existing software unit in the initial layer stack 1404. As such, the directed deployment rule may be evaluated to determine that Solution2 corresponds to the reference parameter contained in the software package 1402. In turn, in the final layer stack 1406, Solution4 may be installed above Solution2 and the patch to Solution2, Solution2_Patch1, at layer 2 based on the directed deployment rule in view of the reference parameter and the ordering behavior parameter of the software package 1402.

Figure 15:
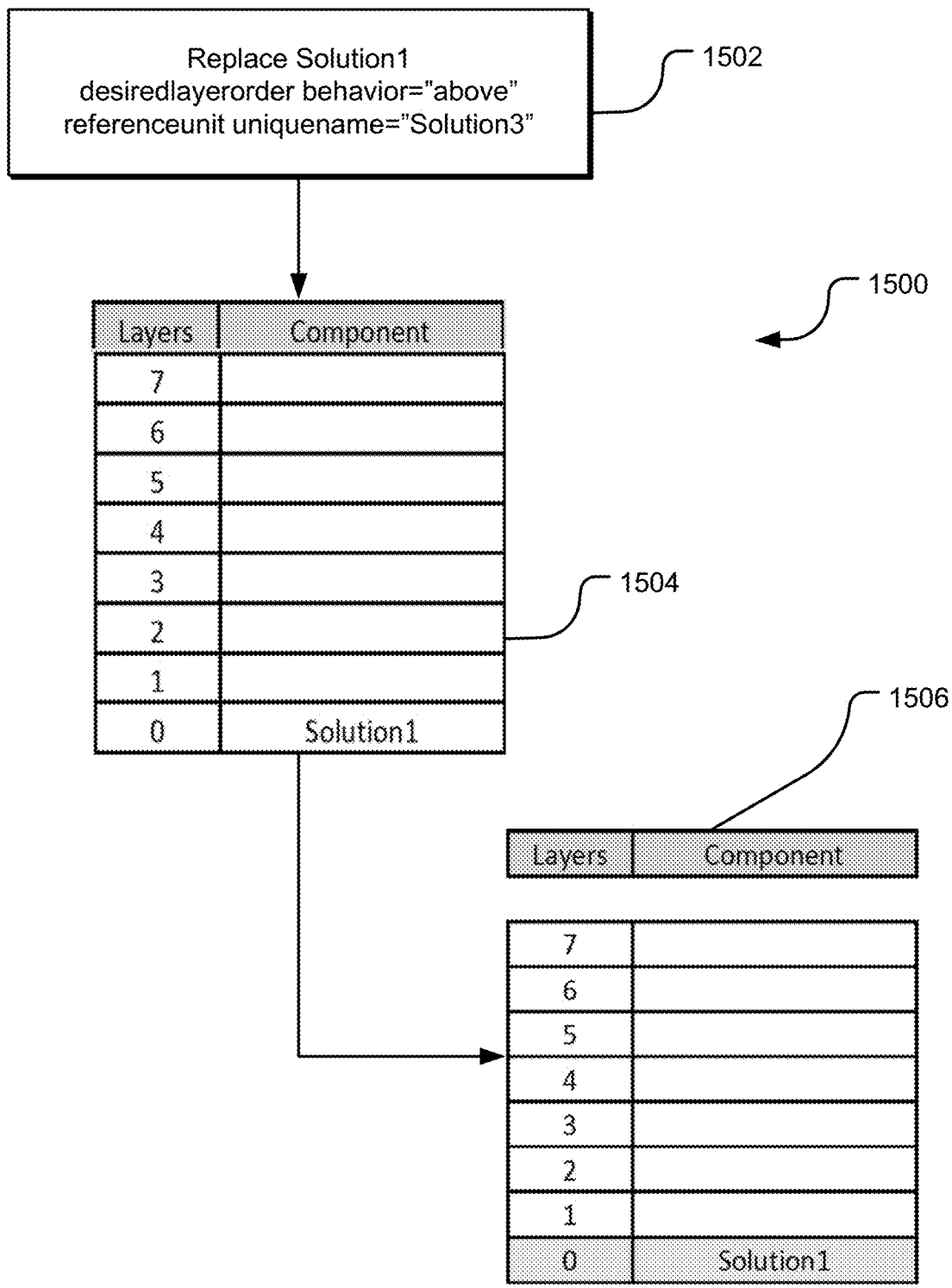

FIG. 15 depicts an example 1500, including a software package 1502 that contains a software unit Solution1. It may be determined that Solution1 exists in the initial layer stack 1504 such that the software unit of the software package 1502 is to replace Solution1 from the initial layer stack 1504. The software package 1502 also includes deployment parameters. However, it may be determined that because Solution1 is a new version of the software unit Solution1 in the initial layer stack 1504, the upgrade rule applies, and the software unit in the software package 1502 may be installed at layer 0 to replace existing Solution1 in the final layer stack 1506. That is, even though deployment parameters were included in the software package 1502, because the upgrade rule was satisfied, the upgrade rule was applied to replace Solution1 in the final layer stack 1506.

Figure 16:
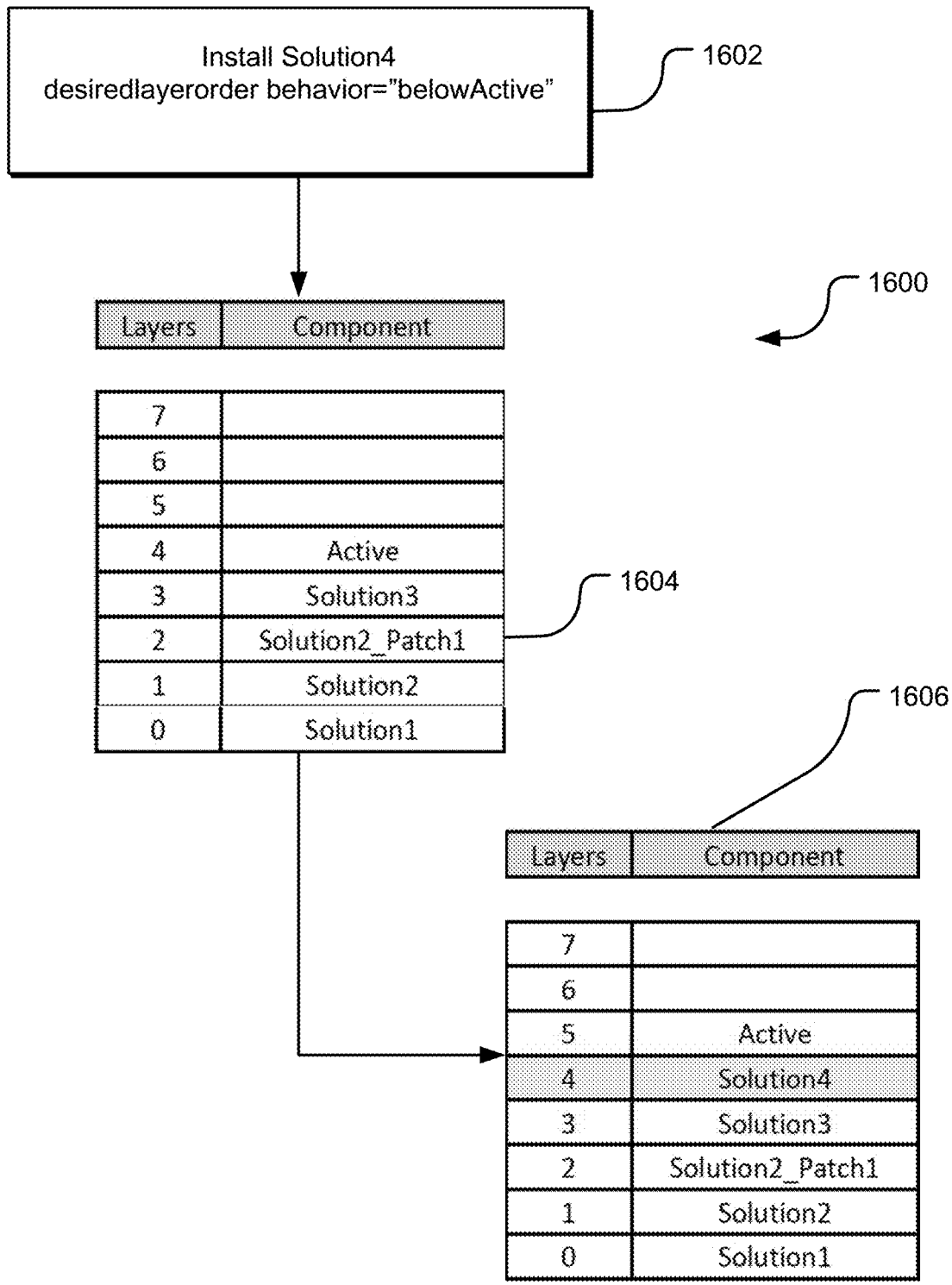

FIG. 16 depicts an example 1600 in which a software package 1602 includes a software unit Solution4. The software package 1602 also includes a deployment parameter comprising an ordering behavior parameter of "belowActive." As can be seen in an initial layer stack 1604, no existing software unit corresponding to Solution4 exists. As such, it may be determined that Solution4 in the software package 1602 is not an upgrade or a patch such that neither the upgrade rule nor patch rule applies. Furthermore, it may be appreciated that the initial layer stack 1604 includes a universal layer comprising an Active layer at layer 4. In turn, because a deployment parameter is provided, the deployment parameter is evaluated. In this example, the "belowActive" ordering behavior parameter may have a reference and relative placement based on the Active layer. That is, rather than suggesting placement relative to a specific software unit contained in the layer stack, the ordering behavior parameter may provide a suggested placement relative to the Active layer in the layer stack. Thus, the directed deployment rule applies and the ordering behavior parameter suggests installation of Solution4 below the Active layer as shown in the final layer stack 1606.

As mentioned above, use of deployment parameters to direct installation of a software unit at a specified or relative position in a layer stack may be beneficial to preserve desired functionality of a software application executed by the software units in the layer stack. For instance, when a software unit installed into a business application environment is installed as a top layer of a layer stack, desired configurations, customizations, or other functionality associated with the existing layer stack may be disrupted, broken, or otherwise inadvertently modified.

One example illustrating this is shown in FIG. 17. An initial layer stack 1700 is provided that includes software units, Software Unit 1 and Software Unit 2, installed at layer 0 and layer 1 of the layer stack 1700. Software Unit 1 may provide base functionality of the software application, which may include a user interface 1710. Software Unit 2 may modify the base functionality of Software Unit 1 to provide a customization to the user interface 170 generated by the software application defined by the layer stack 1700. For example, the user interface 1710 may include a selection function in which Option 1 and Option 2 are presented to the user. Software Unit 2 may provide the functionality to present Option 1 and Option 2 as radio button selections 1712. In addition, the user interface 1710 may include a static background 1714.

Layer stack 1720, shown in FIG. 17, illustrates the installation of a new software unit, Software Unit 3, in layer stack 1720. For example, Software Unit 3 may provide functionality associated with allowing a configurable background 1734 of a user interface 1730. The layer stack 1720 may represent an approach in which Software Unit 3 is installed as a top layer of the layer stack 1720 without allowing a location of the software unit to be defined or suggested. Accordingly, as reflected in the user interface 1730, the installation of Software Unit 3 at the top layer of the layer stack 1720 may facilitate a configurable background 1734 for the user interface 1730. However, Software Unit 3 may also disable or break the customization of the selection interface previously provided by Software Unit 2 for the presentation of the selection options as a radio button selection 1712 because Software Unit 3 is located at the top of the layer stack 1720. Rather, installation of Software Unit 3 at the top layer the layer stack 1720 may result in the option selection being presented as a drop-down menu 1732. That is, the customization of the user interface 1710 provided by Software Unit 2 to present the selection options as a radio button selection 1712 may be broken with the installation of Software Unit 3 at the top layer of the layer stack 1720.

Layer stack 1740 represents an approach in which Software Unit 3 may be located within the layer stack 1740 using deployment parameters such as an ordering behavior parameter and a reference parameter. For example, Software Unit 3 may be provided via a software package that includes an ordering behavior parameter of "below" and a reference parameter corresponding to Software Unit 2. In turn, Software Unit 3 may be installed below Software Unit 2 in the resulting layer stack 1740. Therefore, user interface 1750 may be provided that includes the customizable background 1754 provided by the functionality of Software Unit 3 while maintaining the customization of the selection option being presented as a radio button selection 1752 in the user interface 1750 based on Software Unit 2 being disposed above Software Unit 3 in the layer stack 1740. That is, the customized functionality of Software Unit 2 that was provided in layer stack 1700 may be preserved in layer stack 1740 while also allowing deployment of Software Unit 3 in the layer stack 1740 to provide the customizable background 1754 to the user interface 1750. Accordingly, it may be appreciated that the use of deployment parameters to locate a software unit in a layer stack may allow for customizations or other functionalities provided by other software units the layer stack to be maintained while still allowing other software units to be deployed into the business application environment for enhanced or modified functionality of the software application.

FIG. 18 illustrates an example schematic of a computing device 1800 suitable for implementing aspects of the disclosed technology, including an application platform 1850 as described above. The computing device 1800 includes one or more processor unit(s) 1802, memory 1804, a display 1806, and other interfaces 1808 (e.g., buttons). The memory 1804 generally includes both volatile memory (e.g., RAM) and nonvolatile memory (e.g., flash memory). An operating system 1810, such as the Microsoft Windows® operating system, the Apple macOS operating system, or the Linux operating system, resides in the memory 1804 and is executed by the processor unit(s) 1802, although it should be understood that other operating systems may be employed.

One or more applications 1812 are loaded in the memory 1804 and executed on the operating system 1810 by the processor unit(s) 1802. Applications 1812 may receive input from various input local devices such as a microphone 1834, input accessory 1835 (e.g., keypad, mouse, stylus, touchpad, joystick, an instrument mounted input, or the like). Additionally, the applications 1812 may receive input from one or more remote devices such as remotely-located smart devices by communicating with such devices over a wired or wireless network using more communication transceivers 1830 and an antenna 1838 to provide network connectivity (e.g., a mobile phone network, Wi-Fi®, Bluetooth®). The computing device 1800 may also include various other components, such as a positioning system (e.g., a global positioning satellite transceiver), one or more accelerometers, one or more cameras, an audio interface (e.g., the microphone 1834, an audio amplifier and speaker and/or audio jack), and storage devices 1828. Other configurations may also be employed.

The computing device 1800 further includes a power supply 1816, which is powered by one or more batteries or other power sources and which provides power to other components of the computing device 1800. The power supply 1816 may also be connected to an external power source (not shown) that overrides or recharges the built-in batteries or other power sources.

In an example implementation, the computing device 1800 comprises hardware and/or software embodied by instructions stored in the memory 1804 and/or the storage devices 1828 and processed by the processor unit(s) 1802. The memory 1804 may be the memory of a host device or of an accessory that couples to the host. Additionally or alternatively, the computing device 1800 may comprise one or more field programmable gate arrays (FPGAs), application-specific integrated circuits (ASIC), or other hardware/software/firmware capable of providing the functionality described herein.

The computing device 1800 may include a variety of tangible processor-readable storage media and intangible processor-readable communication signals. Tangible processor-readable storage can be embodied by any available media that can be accessed by the computing device 1800 and includes both volatile and nonvolatile storage media, removable and non-removable storage media. Tangible processor-readable storage media excludes intangible communications signals and includes volatile and nonvolatile, removable and non-removable storage media implemented in any method or technology for storage of information such as processor-readable instructions, data structures, program modules, or other data. Tangible processor-readable storage media includes, but is not limited to, RAM, ROM, EEPROM, flash memory or other memory technology, CDROM, digital versatile disks (DVD) or other optical disk storage, magnetic cassettes, magnetic tape, magnetic disk storage or other magnetic storage devices, or any other tangible medium which can be used to store the desired information and which can be accessed by the computing device 1800. In contrast to tangible processor-readable storage media, intangible processor-readable communication signals may embody processor-readable instructions, data structures, program modules, or other data resident in a modulated data signal, such as a carrier wave or other signal transport mechanism. The term "modulated data signal" means an intangible communications signal that has one or more of its characteristics set or changed in such a manner as to encode information in the signal. By way of example, and not limitation, intangible communication signals include signals traveling through wired media such as a wired network or direct-wired connection, and wireless media such as acoustic, RF, infrared, and other wireless media.

Some implementations may comprise an article of manufacture. An article of manufacture may comprise a tangible storage medium to store logic. Examples of a storage medium may include one or more types of processor-readable storage media capable of storing electronic data, including volatile memory or nonvolatile memory, removable or non-removable memory, erasable or non-erasable memory, writeable or re-writeable memory, and so forth. Examples of the logic may include various software elements, such as software components, programs, applications, computer programs, application programs, system programs, machine programs, operating system software, middleware, firmware, software modules, routines, subroutines, operation segments, methods, procedures, software interfaces, application program interfaces (API), instruction sets, computing code, computer code, code segments, computer code segments, words, values, symbols, or any combination thereof. In one implementation, for example, an article of manufacture may store executable computer program instructions that, when executed by a computer, cause the computer to perform methods and/or operations in accordance with the described implementations. The executable computer program instructions may include any suitable type of code, such as source code, compiled code, interpreted code, executable code, static code, dynamic code, and the like. The executable computer program instructions may be implemented according to a predefined computer language, manner or syntax, for instructing a computer to perform a certain operation segment. The instructions may be implemented using any suitable high-level, low-level, object-oriented, visual, compiled, and/or interpreted programming language.

Various software components described herein are executable by one or more processors, which may include logic machines configured to execute hardware or firmware instructions. For example, the processors may be configured to execute instructions that are part of one or more applications, services, programs, routines, libraries, objects, components, data structures, or other logical constructs. Such instructions may be implemented to perform a task, implement a data type, transform the state of one or more components, achieve a technical effect, or otherwise arrive at a desired result.

Aspects of processors and storage may be integrated together into one or more hardware logic components. Such hardware-logic components may include field-programmable gate arrays (FPGAs), program- and application-specific integrated circuits (PASIC/ASICs), program- and application-specific standard products (PSSP/ASSPs), system-on-a-chip (SOC), and complex programmable logic devices (CPLDs), for example.

The terms "module," "program," and "engine" may be used to describe an aspect of a remote-control device and/or a physical controlled device, implemented to perform a particular function. It will be understood that different modules, programs, and/or engines may be instantiated from the same application, service, code block, object, library, routine, API, function, etc. Likewise, the same module, program, and/or engine may be instantiated by different applications, services, code blocks, objects, routines, APIs, functions, etc. The terms "module," "program," and "engine" may encompass individual or groups of executable files, data files, libraries, drivers, scripts, database records, etc.

It will be appreciated that a "service," as used herein, is an application program executable across one or multiple user sessions. A service may be available to one or more system components, programs, and/or other services. In some implementations, a service may run on one or more server computing devices.

The logical operations making up embodiments described herein may be referred to variously as operations, steps, objects, or modules. Furthermore, it should be understood that logical operations may be performed in any order, adding or omitting operations as desired, regardless of whether operations are labeled or identified as optional, unless explicitly claimed otherwise or a specific order is inherently necessitated by the claim language. While this specification contains many specific implementation details, these should not be construed as limitations on the scope of any inventions or of what may be claimed, but rather as descriptions of features specific to particular implementations of the particular described technology. Certain features that are described in this specification in the context of separate implementations can also be implemented in combination in a single implementation. Conversely, various features that are described in the context of a single implementation can also be implemented in multiple implementations separately or in any suitable sub combination. Moreover, although features may be described above as acting in certain combinations and even initially claimed as such, one or more features from a claimed combination can in some cases be excised from the combination, and the claimed combination may be directed to a sub combination or variation of a sub combination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the implementations described above should not be understood as requiring such separation in all implementations, and it should be understood that the described program components and systems can generally be integrated together in a single software product or packaged into multiple software products.

An example method of installing a software unit in an application environment is disclosed. The method includes receiving a software package comprising at least one software unit. The method further includes identifying, for the at least one software unit an ordering behavior parameter regarding relative placement of the at least one software unit in a layer stack of the application environment. The layer stack defines an order of operation of software units in the layer stack. The method also includes identifying a reference parameter from the software package identifying one or more reference software units in the layer stack. The method further includes installing the software unit into the layer stack of the application environment based on the ordering behavior parameter and the reference parameter.

Another example method of any preceding method is provided, wherein the ordering behavior parameter may include at least one of an above value, a below value, a between value, a top of stack value, or a bottom of stack value.

Another example method of any preceding method is provided, the method further including applying at least one of a plurality of hierarchical rules for software unit placement in the layer stack, wherein the installing the software unit into the layer stack based on the ordering behavior parameter and the reference parameter is at least one of the plurality of hierarchical rules. In this example method, the installing the software unit into the layer stack based on the ordering behavior parameter and the reference parameter may only occur if no other higher-order rules in the hierarchical rules apply to the software unit. In an example, the software unit may be installed at a default position of the layer stack if one of the ordering behavior parameter or the reference parameter is invalid and no other one of the plurality of hierarchical rules applies.

Another example method of any preceding method is provided, wherein the software unit may include one or more software components for application of functionality to data in the application environment.

Another example method of any preceding method is provided, the method further including merging at least one software component of the software unit into one or more other layers of the layer stack after installing the software unit based on an installed location of the software unit in the layer stack.

An example system for executing an application environment is provided. The system includes a database for storage of data. The system also includes an application platform comprising a layer stack comprising one or more software units executable relative to the data. The system includes an application lifecycle management module (ALM) operative to receive a software package comprising at least one software unit, identify an ordering behavior parameter regarding relative placement of the at least one software unit in the layer stack of the application platform and a reference parameter identifying one or more reference software units in the layer stack from the software package for the at least one software unit, and to install the software unit into the layer stack of the application platform based on the ordering behavior parameter and the reference parameter.

Another example system of any preceding method is provided, wherein the ordering behavior parameter may include at least one of an above value, a below value, a between value, a top of stack value, or a bottom of stack value.

Another example system of any preceding method is provided, wherein, the ALM module further includes a plurality of hierarchical rules for software unit placement in the layer stack. The installing the software unit into the layer stack based on the ordering behavior parameter and the reference parameter may be at least one of the plurality of hierarchical rules. Another example system of any preceding method is provided, wherein the ALM module may install the software unit into the layer stack based on the ordering behavior parameter and the reference parameter only if no other higher-order rules in the hierarchical rules apply to the software unit. The ALM module may install the software unit at a default position of the layer stack if one of the ordering behavior parameter or the reference parameter is invalid and no other one of the plurality of hierarchical rules applies.

Another example system of any preceding method is provided, wherein the software unit may include one or more software components for application of functionality to data in the database of the application environment.

Another example system of any preceding method is provided, wherein the ALM module may be operative to merge at least one software component of the software unit into one or more other layers of the layer stack after installing the software unit based on an installed location of the software unit in the layer stack.

An example one or more tangible processor-readable storage media embodied with instructions for executing on one or more processors and circuits of a device a process for installation of a software package in an application environment is provided. The process includes receiving a software package comprising at least one software unit and identifying, for the at least one software unit, an ordering behavior parameter regarding relative placement of the at least one software unit in a layer stack of the application environment and a reference parameter from the software package identifying one or more reference software units in the layer stack. The process also includes installing the software unit into the layer stack of the application environment based on the ordering behavior parameter and the reference parameter.

One or more other example tangible processor-readable storage media of any preceding media is provided, wherein the ordering behavior parameter may include at least one of an above value, a below value, a between value, a top of stack value, or a bottom of stack value.

One or more other example tangible processor-readable storage media of any preceding media is provided, wherein the process may include applying at least one of a plurality of hierarchical rules for software unit placement in the layer stack. The installing the software unit into the layer stack based on the ordering behavior parameter and the reference parameter may be at least one of the plurality of hierarchical rules. The installing the software unit into the layer stack based on the ordering behavior parameter and the reference parameter may only occurs if no other higher-order rules in the hierarchical rules apply to the software unit.

One or more other example tangible processor-readable storage media of any preceding media is provided, wherein the software unit may be installed at a default position of the layer stack if one of the ordering behavior parameter or the reference parameter is invalid and no other one of the plurality of hierarchical rules applies.

One or more other example tangible processor-readable storage media of any preceding media is provided, wherein the software unit may include one or more software components for application of functionality to data in the application environment.

An example system for installing a software unit in an application environment is disclosed. The system includes a means for receiving a software package comprising at least one software unit. The system further includes a means for identifying, for the at least one software unit an ordering behavior parameter regarding relative placement of the at least one software unit in a layer stack of the application environment. The layer stack defines an order of operation of software units in the layer stack. The system also includes a means for identifying a reference parameter from the software package identifying one or more reference software units in the layer stack. The system further includes a means for installing the software unit into the layer stack of the application environment based on the ordering behavior parameter and the reference parameter.

Another example system of any preceding system is provided, wherein the ordering behavior parameter may include at least one of an above value, a below value, a between value, a top of stack value, or a bottom of stack value.

Another example system of any preceding system is provided, further including a means for applying at least one of a plurality of hierarchical rules for software unit placement in the layer stack, wherein the installing the software unit into the layer stack based on the ordering behavior parameter and the reference parameter is at least one of the plurality of hierarchical rules. In this example system, the means for installing the software unit into the layer stack based on the ordering behavior parameter and the reference parameter may only apply if no other higher-order rules in the hierarchical rules apply to the software unit. In an example, the software unit may be installed at a default position of the layer stack if one of the ordering behavior parameter or the reference parameter is invalid and no other one of the plurality of hierarchical rules applies.

Another system method of any preceding system is provided, wherein the software unit may include one or more software components for application of functionality to data in the application environment.

Another example system of any preceding system is provided, the system further including a means for merging at least one software component of the software unit into one or more other layers of the layer stack after installing the software unit based on an installed location of the software unit in the layer stack.

Thus, particular implementations of the subject matter have been described. Other implementations are within the scope of the following claims. In some cases, the actions recited in the claims can be performed in a different order and still achieve desirable results. In addition, the processes depicted in the accompanying figures do not necessarily require the particular order shown, or sequential order, to achieve desirable results. In certain implementations, multitasking and parallel processing may be advantageous.

A number of implementations of the described technology have been described. Nevertheless, it will be understood that various modifications can be made without departing from the spirit and scope of the recited claims.

What is claimed is:

1. A method of installing at least one software unit in an application environment, the method comprising:
   receiving a software package at a computing device of the application environment, the software package including the at least one software unit, a reference parameter identifying one or more reference software units in a layer stack executing in the application environment, and an ordering behavior parameter regarding placement during installation of the at least one software unit in the layer stack executed in the application environment relative to the one or more reference software units identified by the reference parameter, wherein the layer stack defines an order of operation of software units in the layer stack;
   identifying by the computing device, for the at least one software unit, the ordering behavior parameter and the reference parameter from the software package; and
   installing by the computing device the at least one software unit into the layer stack executed in the application environment based on the identified ordering behavior parameter and the identified reference parameter received in the software package.

2. The method of claim 1, wherein the ordering behavior parameter comprises at least one of an above value, a below value, a between value, a top of stack value, or a bottom of stack value.

3. The method of claim 1, further comprising:
   applying at least one of a plurality of hierarchical rules for software unit placement in the layer stack, wherein the installing the at least one software unit into the layer stack based on the ordering behavior parameter and the reference parameter comprises at least one of the plurality of hierarchical rules.

4. The method of claim 3, wherein the installing the at least one software unit into the layer stack based on the ordering behavior parameter and the reference parameter only occurs if no other higher-order rules in the hierarchical rules apply to the at least one software unit.

5. The method of claim 4, wherein the at least one software unit is installed at a default position of the layer stack if one of the ordering behavior parameter or the reference parameter is invalid and no other one of the plurality of hierarchical rules applies.

6. The method of claim 1, wherein the at least one software unit comprises one or more software components for application of functionality to data in the application environment.

7. The method of claim 1, further comprising:
   merging at least one software component of the at least one software unit into one or more other layers of the layer stack after installing the at least one software unit based on an installed location of the at least one software unit in the layer stack.

8. A system for executing an application environment of a computing device, the system comprising:
   a database for storage of data;
   an application platform in which a layer stack including one or more software units is executed relative to the data; and
   an application lifecycle management module (ALM) executed by a processor of the computing device that is operative to:
      receive a software package at the computing device of the application environment, the software package including at least one software unit, a reference parameter identifying one or more reference software units in the layer stack executing in the application environment, and an ordering behavior parameter regarding placement during installation of the at least one software unit in the layer stack executed in the application environment relative to the one or more reference software units identified by the reference parameter, wherein the layer stack defines an order of operation of software units in the layer stack;
      identify by the computing device, for the at least one software unit, the ordering behavior parameter and the reference parameter from the software package; and
      install by the computing device the at least one software unit into the layer stack executed in the application platform based on the identified ordering behavior parameter and the identified reference parameter received in the software package.

9. The system of claim 8, wherein the ordering behavior parameter comprises at least one of an above value, a below value, a between value, a top of stack value, or a bottom of stack value.

10. The system of claim 8, wherein the ALM further comprises a plurality of hierarchical rules for software unit placement in the layer stack, wherein the installing the at least one software unit into the layer stack based on the ordering behavior parameter and the reference parameter comprises at least one of the plurality of hierarchical rules.

11. The system of claim 10, wherein the ALM installs the at least one software unit into the layer stack based on the ordering behavior parameter and the reference parameter only if no other higher-order rules in the hierarchical rules apply to the at least one software unit.

12. The system of claim 11, wherein the ALM installs the at least one software unit at a default position of the layer stack if one of the ordering behavior parameter or the reference parameter is invalid and no other one of the plurality of hierarchical rules applies.

13. The system of claim 8, wherein the at least one software unit comprises one or more software components for application of functionality to data in the database of the application environment.

14. The system of claim 8, wherein the ALM is further operative to merge at least one software component of the at least one software unit into one or more other layers of the layer stack after installing the at least one software unit based on an installed location of the at least one software unit in the layer stack.

15. One or more tangible processor-readable storage media embodied with instructions for executing on one or more processors to perform a process for installation of a software package in an application environment, the process comprising:

receiving the software package at a computing device of the application environment, the software package including at least one software unit, a reference parameter identifying one or more reference software units in a layer stack executing in the application environment, and an ordering behavior parameter regarding placement during installation of the at least one software unit in the layer stack executed in the application environment relative to the one or more reference software units identified by the reference parameter, wherein the layer stack defines an order of operation of software units in the layer stack;

identifying by the computing device, for the at least one software unit, the ordering behavior parameter and the reference parameter from the software package; and installing by the computing device the at least one software unit into the layer stack executed in the application environment based on the identified ordering behavior parameter and the identified reference parameter received in the software package.

16. The one or more tangible processor-readable storage media of claim 15, wherein the ordering behavior parameter comprises at least one of an above value, a below value, a between value, a top of stack value, or a bottom of stack value.

17. The one or more tangible processor-readable storage media of claim 15, wherein the process further comprises:

applying at least one of a plurality of hierarchical rules for software unit placement in the layer stack, wherein the installing the at least one software unit into the layer stack based on the ordering behavior parameter and the reference parameter comprises at least one of the plurality of hierarchical rules.

18. The one or more tangible processor-readable storage media of claim 17, wherein the installing the at least one software unit into the layer stack based on the ordering behavior parameter and the reference parameter only occurs if no other higher-order rules in the hierarchical rules apply to the at least one software unit.

19. The one or more tangible processor-readable storage media of claim 18, wherein the at least one software unit is installed at a default position of the layer stack if one of the ordering behavior parameter or the reference parameter is invalid and no other one of the plurality of hierarchical rules applies.

20. The one or more tangible processor-readable storage media of claim 15, wherein the at least one software unit comprises one or more software components for application of functionality to data in the application environment.

* * * * *